United States Patent
Zhang et al.

(10) Patent No.: US 6,652,779 B1
(45) Date of Patent: Nov. 25, 2003

(54) POLYMERS CONTAINING POLYENE-BASED SECOND-ORDER NONLINEAR OPTICAL CHROMOPHORES AND DEVICES INCORPORATING THE SAME

(75) Inventors: Cheng Zhang, Los Angeles, CA (US); Harold R. Fetterman, Pacific Palisades, CA (US); William Steier, San Marino, CA (US); Joseph Michael, Los Angeles, CA (US)

(73) Assignee: Pacific Wave Industries, Inc., Beverly Hills, CA (US)

( * ) Notice: Subject to any disclaimer, the term of this patent is extended or adjusted under 35 U.S.C. 154(b) by 0 days.

(21) Appl. No.: 09/679,937

(22) Filed: Oct. 5, 2000

Related U.S. Application Data

(63) Continuation-in-part of application No. 09/488,422, filed on Jan. 20, 2000, now Pat. No. 6,361,717, which is a continuation-in-part of application No. 09/122,806, filed on Jul. 27, 1998, now Pat. No. 6,067,186, application No. 09/679,937, which is a continuation-in-part of application No. 09/551,685, filed on Apr. 18, 2000, now Pat. No. 6,348,992, and a continuation-in-part of application No. 09/546,930, filed on Apr. 11, 2000.

(51) Int. Cl.[7] ............................. F21V 9/00; G02F 1/35
(52) U.S. Cl. ....................................... 252/582; 359/328
(58) Field of Search .......................... 252/582; 359/328

(56) References Cited

U.S. PATENT DOCUMENTS

| | | | |
|---|---|---|---|
| 3,821,182 A | 6/1974 | Baird, Jr. et al. | 260/91.7 |
| 3,879,330 A | 4/1975 | Lustig | 260/31.8 |
| 3,932,693 A | 1/1976 | Shaw et al. | 428/518 |
| 4,048,428 A | 9/1977 | Baird, Jr. et al. | 526/343 |
| 4,064,296 A | 12/1977 | Bornstein et al. | 428/35 |

(List continued on next page.)

OTHER PUBLICATIONS

D. G. Girton, et al., "20 GHz electro–optic polymer Mach–Zehnder modulator", *Applied Physics Letters*, vol. 58, No. 16, pp. 1730–1732 (1991).

(List continued on next page.)

*Primary Examiner*—Philip Tucker
(74) *Attorney, Agent, or Firm*—Henricks, Slavin & Holmes LLP

(57) ABSTRACT

Polymers containing polyene-bridged second-order nonlinear optical chromophores and devices incorporating the same are disclosed. The chromophores are functionalized and incorporated into a series of polymers ranging from linear polyesters, linear poly[ester-imide]s, chain-crosslinked polyesters/poly[ester-imide]s, to crosslinked star-shaped/dendritic macromolecules. An exemplary preferred polymer is a linear chain polymer formed from a dihydroxy-functionalized polyene-bridged chromophore, a diacid or diacid dichloride, and a diol. In a preferred embodiment, the diol structure also includes at least one imide group. Another exemplary preferred polymer is a crosslinked polymer comprised of a linear chain polymer formed from a dihydroxy-functionalized polyene-bridged chromophore, a diacid or diacid dichloride and a diol. The crosslinking is realized by thermally induced cyclolization of trifluorovinylethers which are attached to the diol co-monomer and/or chromophore in the linear chain polymer chain. In a preferred embodiment, the diol structure also includes at least one imide group. Another exemplary preferred polymer is a crosslinked polymer made from crosslinkable star-shaped high molecular weight (larger than 2,000) structure containing polyene-bridged chromophores. In a preferred embodiment, the crosslinking groups are multiple trifluorovinylether groups located at the periphery of the star-shaped structure. Another exemplary preferred polymer is a crosslinked polymer made from crosslinkable dendritic structure having a chromophore core and one or more dendrons. In a preferred embodiment, the crosslinking groups are multiple trifluorovinylether groups located at the periphery of the dendritic structure.

17 Claims, 17 Drawing Sheets

U.S. PATENT DOCUMENTS

| | | | |
|---|---|---|---|
| 4,284,671 A | 8/1981 | Cancio et al. | 428/35 |
| 4,837,293 A | 6/1989 | Silvis et al. | 528/99 |
| 4,914,138 A | 4/1990 | Percec et al. | 525/71 |
| 4,945,134 A | 7/1990 | Wallace et al. | 525/301 |
| 5,017,411 A | 5/1991 | Chen-Tsai et al. | 428/36.6 |
| 5,039,751 A | 8/1991 | Wallace et al. | 525/301 |
| 5,079,321 A | 1/1992 | Sperling et al. | 526/311 |
| 5,093,466 A | 3/1992 | Patton et al. | 528/343 |
| 5,156,774 A | 10/1992 | Leising et al. | 252/582 |
| 5,196,147 A | 3/1993 | Taketani et al. | 252/589 |
| 5,223,603 A | 6/1993 | Patton et al. | 528/343 |
| 5,290,630 A | 3/1994 | Devonald et al. | 428/333 |
| 5,370,937 A | 12/1994 | Lee et al. | 428/448 |
| 5,432,286 A | 7/1995 | Cabrera et al. | 546/270 |
| 5,440,446 A | 8/1995 | Shaw et al. | 361/301.5 |
| 5,500,302 A | 3/1996 | Phillips et al. | 428/474.4 |
| 5,514,799 A | 5/1996 | Varanasi et al. | 544/300 |
| 5,535,048 A | 7/1996 | Mignani et al. | 359/326 |
| 5,549,853 A | 8/1996 | Beckmann et al. | 252/582 |
| 5,609,555 A | 3/1997 | Lee et al. | 493/210 |
| 5,637,365 A | 6/1997 | Carlblom | 428/354 |
| 5,663,308 A | 9/1997 | Gibbons et al. | 534/573 |
| 5,670,603 A | 9/1997 | Wu et al. | 528/190 |
| 5,676,884 A | 10/1997 | Tiers et al. | 252/582 |
| 5,679,763 A | 10/1997 | Jen et al. | 528/403 |
| 5,686,126 A | 11/1997 | Noel et al. | 426/127 |
| 5,688,906 A | 11/1997 | Jen et al. | 528/353 |
| 5,697,744 A | 12/1997 | Medal | 411/82 |
| 5,698,134 A | 12/1997 | Jubb et al. | 252/299.01 |
| 5,707,691 A | 1/1998 | Plester et al. | 427/472 |
| 5,714,304 A | 2/1998 | Gibbons et al. | 430/270.11 |
| 5,718,845 A | 2/1998 | Drost et al. | 252/582 |
| 5,725,909 A | 3/1998 | Shaw et al. | 427/412.1 |
| 5,738,806 A | 4/1998 | Beckmann et al. | 252/582 |
| 5,776,374 A | 7/1998 | Newsham et al. | 252/582 |
| 5,783,306 A | 7/1998 | Therien et al. | 428/411.1 |
| 5,804,101 A | 9/1998 | Marder et al. | 252/582 |
| 5,846,638 A | 12/1998 | Meissner | 428/220 |
| 5,854,866 A | 12/1998 | Leonard | 385/39 |
| 5,882,785 A | 3/1999 | Hollins et al. | 428/333 |
| 5,883,259 A | 3/1999 | Kim et al. | 548/224 |
| 5,885,672 A | 3/1999 | Phillips et al. | 428/35.2 |
| 5,887,116 A | 3/1999 | Grote | 385/2 |
| 5,889,131 A | 3/1999 | Kim et al. | 526/262 |
| 5,892,859 A | 4/1999 | Grote | 385/2 |

OTHER PUBLICATIONS

D. M. Burland, et al., "Second–Order Nonlinearity in Poyed–Polymer Systems", *Chemical Reviews*, vol. 94, pp. 31–75 (1994).

S. Kalluri, "Improved poling and thermal stability of sol–gel nonlinear optical polymers", *Applied Physics Letters*, vol. 65, No. 21, pp. 2651–2653 (1994).

I. Cabrere, et al., "A New Class of Planar–Locked Polyene Dyes for Nonlinear Optics", *Advanced Materials*, vol. 6, pp. 43–45 (1994).

W. Wang, "40–GHz Polymer Electrooptic Phase Modulators", *IEEE Photonics Technology Letters*, vol. 7, No. 6, pp. 638–640 (1995).

L. R. Dalton, et al., "Sythesis and Processing of Improved Organic Second–Order Nonlinear Optical Materials for Applications in Photonics", *Chemistry of Materials*, vol. 7, pp. 1060–1081 (1995).

S. Kalluri, "Monolithic Integration of Waveguide Polymer Electrooptic Modulators on VLSI Circuitry", *IEEE Photonics Technology Letters*, vol. 8, No. 5, pp. 644–646 (1996).

Y. Shi, et al., "Fabrication and Characterization of High–Speed Polyurethane–Disperse Red 19 Integrated Electrooptic Modulators for Analog System Applications", *IEEE Journal of Selected Topics in Quantum Electronics*, vol. 2, No. 2, pp. 289–299 (1996).

C. Shu, et al., "Synthesis of second–order nonlinear optical chromophores with enhanced thermal stability: a conformation–locked trans–polyene approach", *Chemical Communication*, pp. 2279–2280 (1996).

A. Chen, "Optimized Oxygen Plasma Etching of Polyurethan–Based Electro–optic Polymer for Low Loss Optical Waveguide Fabrication", *Journal of Electrochemical Society*, vol. 143, No. 11, pp. 3648–3651 (1996).

D. X. Zhu, "Noncollinear four–wave mixing in a broad area semiconductor optical amplifier", *Applied Physics Letters*, vol. 70, No. 16, pp. 2082–2084 (1997).

D. Chen, "Demonstration of 110GHz eletro–optic polymer modulators", *Applied Physics Letters*, vol. 70, No. 25, pp. 3335–3337 (1997).

L. Dalton, "Polymeric electro–optic modulators", *Chemistry & Industry*, pp. 510–514 (1997).

S. Ermer, "Synthesis and Nonlinearity of Triene Chromophores Containing the Cyclohexen Ring Structure", *Chemistry of Materials*, Vol 9, pp. 1437–1442 (1997).

A. Harper, et al., "Translating microscopic optical nonlinearity into macroscopic optical nonlinearity: the role of chromophore–chromophore electrostatic interactions", *Journal of Optical Society of America: B*, vol. 15, No. 1, pp. 329–337 (1998).

A. Chen, et al., "Low–$V_\pi$ electro–optic modular with a high–$\mu\beta$ chromophore and a constant–bias field", *Optics Letters*, vol. 23, No. 6, pp. 478–480 (1998).

C. Shu, et al., Nonlinear Optical Chromophores with Configuration–Locked Polyenes Possessing Enhanced Thermal Stability and Chemical Stability, *Chemistry of Materials*, vol. 10, pp. 3284–3286 (1998).

L. R. Dalton et al., "From molecules to opto–chips: organic electro–optic materials," *J. Mater. Chem.*, 1999, 9, 1905–1920.

L. R. Dalton, "Polymeric electro–optic materials: optimization of electro–optic activity, minimization of optical loss, and fine–tuning of device performance," *Opt. Eng.* 39(3) 589–595 (Mar. 2000).

T. M. Londergan et al., "Dendrimer Functionalized NLO Chromophores," *Polymer Preprints* 2000, 41(1), 783–784.

H. Ma et al., "A Novel Class of High–Performance Perfluorocyclobutate–Containing Polymers for Second–Order Nonlinear Optics," *Chem. Mater.* 2000, 12, 1187–1189 (Published on Web Apr. 7, 2000).

H. Ma et al., "Novel Perfluorocyclobutate–Containing Thermoset Polymers and Dendrimers for Electro–Optic Devices," *Polym. Mater. Sci. Eng.* (2000), 83 165–166.

N. Nemoto et al., "Novel Types of Polyesters Containing Second–Order Nonlinear Optically Active Chromophores with High Density," *Macromolecules* 1996, 29, 2365–2371.

Z. Sekkat et al., "Room–Temperature Photoinduced Poling and Thermal Poling of a Rigid Main–Chain Polymer with Polar Azo Dyes in the Side Chain," *Chem. Mater.* 1995, 7, 142–147.

S. Yokoyama et al., "Second harmonic generation of dipolar dendrons in the assembled thin films," *Thin Solid Films* 331 (1998) 248–253.

S. Yokoyama et al., "Intermolecular Coupling Enhancement of the Molecular Hyperpolarizability in Multichromophoric Dipolar Dendrons," *J. Am. Chem. Soc.* 2000, 122(13), 3174–3181 (Published on Web Mar. 11, 2000).

C. Zhang et al., "Chromophore Incorporating Fluorinated Aromatic Polyester for Electro–optic Applications," *Polymer Preprints* 40(2) Aug. 1999.

Y. Zhang et al., "A new hyperbranched polymer with polar chromophores for nonlinear optics," *Polymer* (1997), 38(12), 2893–2897.

Preferred electron donor (D)     Preferred electron acceptor (A)

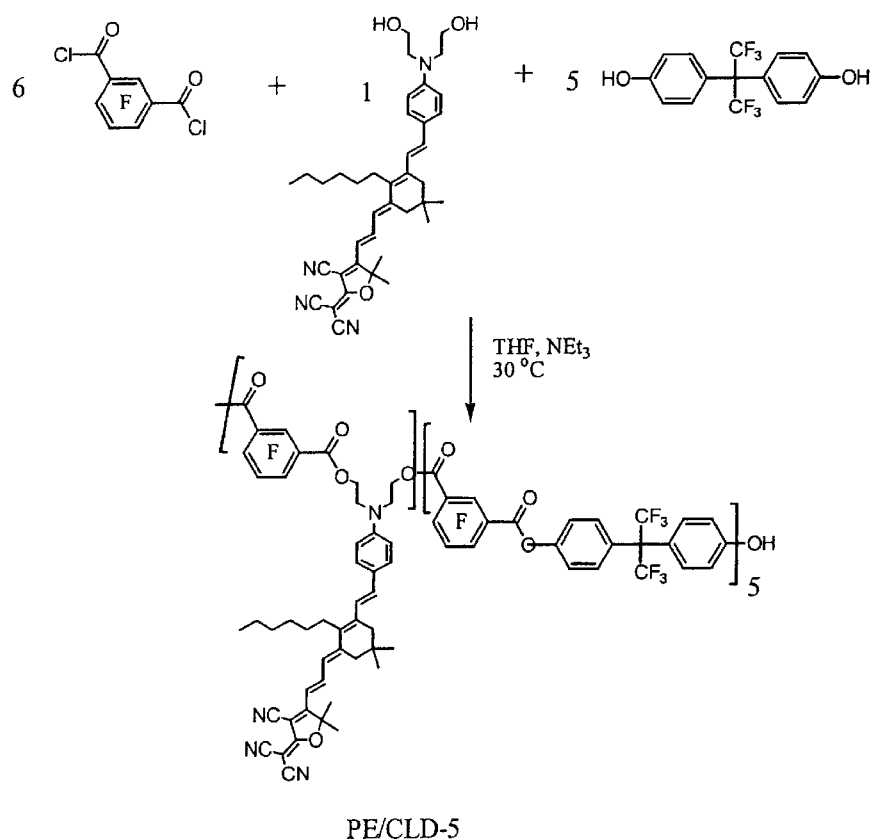
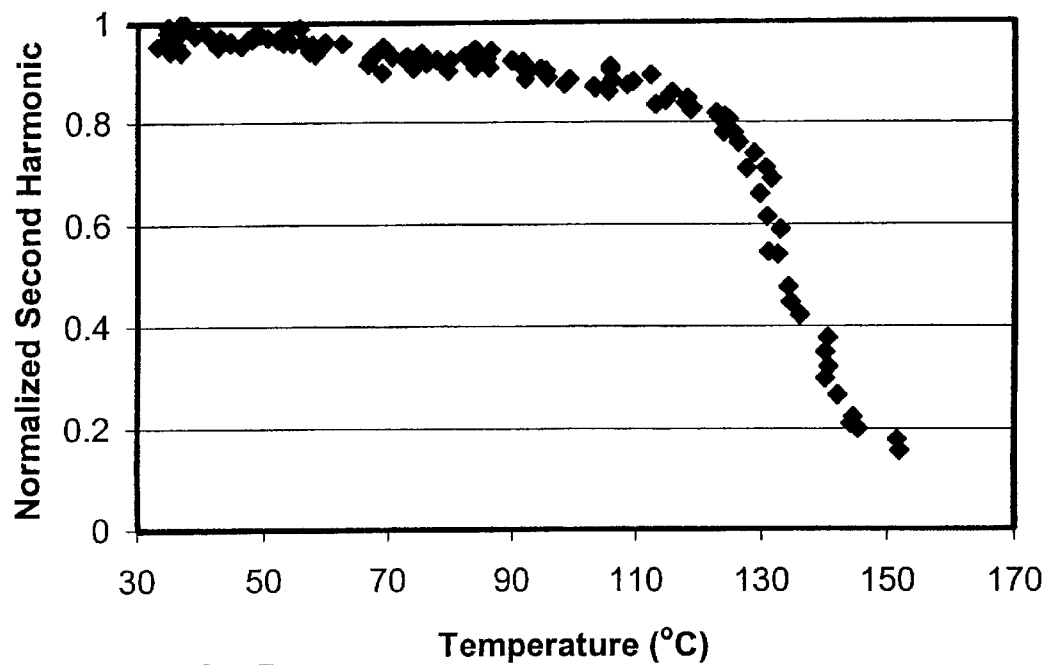
FIG. 5

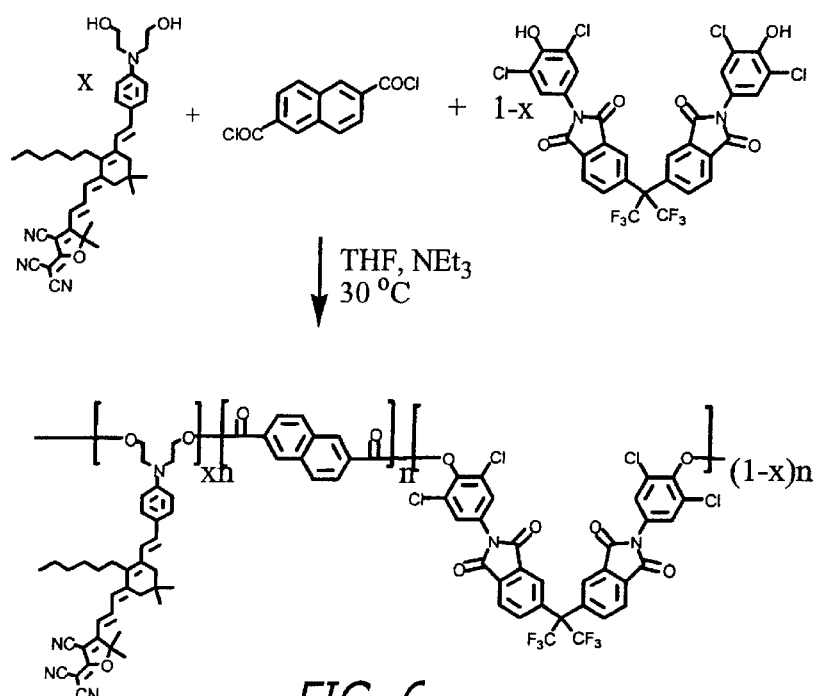
FIG. 6
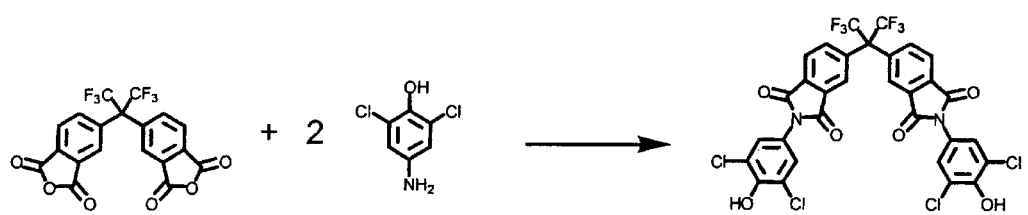
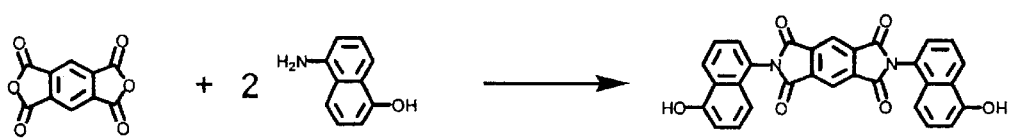
FIG. 7

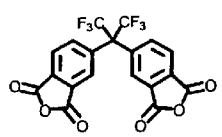
4,4'-(Hexaflurolsopropylidene) diphthalicdianhydride

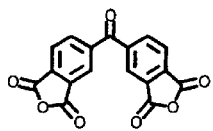
3,3',4,4'-benzophenonetetra carboxylic dianhydride

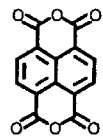
1,4,5,8-naphthalenetetra carboxylicdianhydride

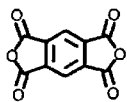
1,2,4,5-benzenetrtra carboxylicdianhydride

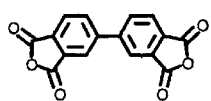
3,3'-4,4'-biphenyltetra carboxylic dianhydride

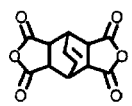
Bicyclo[2.2.2]oct-7-ene-2,3,5,6-tetracarboxylicdianhydride

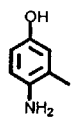
4-amino-M-cresol

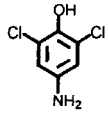
4-amino-2,6-dichlorophenol

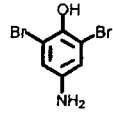
4-amino-2,6-dibromophenol

3-aminophenol

4-aminophenol

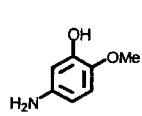
3-amino-6-methoxy phenol

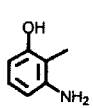
3-amino-2-methyl phenol

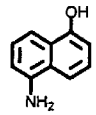
5-amino-1-naphthol

FIG. 8

POLYMERS CONTAINING POLYENE-BASED SECOND-ORDER NONLINEAR OPTICAL CHROMOPHORES AND DEVICES INCORPORATING THE SAME

CROSS-REFERENCE TO RELATED APPLICATIONS

This application is a continuation-in-part of U.S. patent application Ser. No. 09/488,422 entitled "Sterically Stabilized Second-Order Nonlinear Optical Chromophores and Devices Incorporating the Same" filed on Jan. 20, 2000, now U.S. Pat. No. 6,361,717 which is a continuation-in-part of U.S. patent application Ser. No. 09/122,806 entitled "Class of High Hyperpolarizability Organic Chromophores and Process for Synthesizing the Same" filed on Jul. 27, 1998, now U.S. Pat. No. 6,067,186. This application is also a continuation-in-part of U.S. patent application Ser. No. 09/546,930 entitled "Sterically Stabilized Second-Order Nonlinear Optical Chromophores With Improved Stability and Devices Incorporating the Same" filed on Apr. 11, 2000, pending and a continuation-in-part of U.S. patent application Ser. No. 09/551,685 entitled "Sterically Stabilized Second-Order Nonlinear Optical Chromophores With Improved Stability and Devices Incorporating the Same" filed on Apr. 18, 2000, now U.S. Pat. No. 6,348,992. The disclosures of these applications are incorporated herein by reference in their entirety.

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-97-1-0491, F49620-98-C-0059, F49620-98-C-0077, F49620-99-0040 awarded by United States Air Force. The government of the United States of America has certain rights in this invention as provided by these contracts.

BACKGROUND OF THE INVENTION

1. Field of the Invention

The present invention relates to incorporation of nonlinear optical chromophores into polymer mattrices and, more particularly, pertains to polymers containing polyene-bridged second-order nonlinear optical chromophores and devices incorporating the same.

2. Description of the Related Art

Organic second-order nonlinear optical (NLO) materials have received increasing attention for applications involving signal processing and communications. Second-order NLO chromophores (also referred to as chromophore hereafter) can provide higher electro-optic activity than inorganic materials such as lithium niobate. ("Electro-optic polymer modulators for 1.55 $\mu$m wavelength using phenyltetraene bridged chromophore in polycarbonate", M.-C. Oh, et al., *Applied Physics Letters*, vol. 76, no. 24, pp 3525–3527.) However, it remains a challenge to incorporate high $\mu\beta$ ($\mu$-dipole moment, $\beta$-first hyperpolarizability) NLO chromophores into thermally stable and low optical loss polymers.

There are two basic ways of incorporating chromophores into polymers. One is the guest-host approach where chromophore and host polymer are physically mixed and dissolved in a solvent to make a solution for film spin-casting. The other approach is to chemically (covalently) attach chromophore to polymer chains (hereafter refered as covalant approach). The guest-host approach has been used in demonstration/first generation electro-optic devices ("Electro-optic polymer modulators for 1.55 $\mu$m wavelength using phenyltetraene bridged chromophore in polycarbonate", M.-C. Oh, et al., *Applied Physics Letters*, vol. 76, no. 24, pp 3525–3527) and a dynamic thermal stability of 120° C. was obtained for the CLD-1/amorphous polycarbonate material. However, this stability is not high enough for long term operation (e.g., room temperature for 5 years or 85° C. for 1,000 hours). Studies on various guest-host systems have revealed that there are several intrinsic problems with the guest-host approach. First, high glass transition temperature ($T_g$) host polymers are usually very insoluble. Second, compatibility between NLO chromophores and high $T_g$ hosts is generally poor, which leads to phase separation, low poling efficiency and high optical loss. Third, thermal stability obtainable in guest-host systems is very limited because chromophores are not locked to polymer chains by covalant bonds.

High $\mu\beta$ chromophores such as the FTC and CLD chromophores disclosed in the above-referenced patent applications are highly polar molecules. Strong electrostatic interaction happens when these chromophores are close to each other. Such interactions strongly attenuate the efficient induction of acentric chromophore order (hence, electro-optic activity) by electric field poling. When chromophore molecules are bonded to polymer chain(s), they can no longer move freely to form a separate phase or tightly packed aggregates.

SUMMARY OF THE INVENTION

According to the present invention, high thermal stability of CLD/FTC materials is obtained by using rigid monomers and high crosslinking density, and by locking two ends of chromophore to polymer chains. This high thermal stability has been observed during. extensive studies on a covalent approach to incorporating FTC and CLD types of chromphores into polyurethane 3-dimensional networks.

Optical loss is another important issue that must be considered in NLO polymer design and synthesis. Polyurethanes are intrinsically lossy at the two important communication wavelengths 1.3 $\mu$m and 1.55 $\mu$m due to the existence of N—H group. According to the present invention, in order to reduce optical losses at 1.3 $\mu$m and 1.55 $\mu$m, other crosslinking agent(s) that do not introduce significant absorption at the two wavelengths are used.

According to the present invention, new classes of polymers are provided which address the thermal stability and optical loss issues in electro-optical materials. The chromophores of the present invention are functionalized and incorporated into a series of polymers ranging from linear polyesters, linear poly[ester-imide]s, chain-crosslinked polyesters/poly[ester-imide]s, to crosslinked star-shaped/dendritic macromolecules. The linear polymer approach offers more straightforward synthetic scheme and moderate thermal stability, while the crosslinked approachs provide higher thermal stability due to double-end locking of chromophores and cross-linking of polymer segments. Also, according to the present invention, star-shaped/dendritic macromolecules are provided which reduce interchromophore interaction between chromophores, and hence afford low optical loss and higher order of poling-induced chromophore dipole alignment in addition to high thermal stability.

An exemplary preferred polymer according to the present invention is a linear chain polymer formed from a dihydroxy-functionalized polyene-bridged chromophore, a diacid or diacid dichloride, and a diol. In a preferred embodiment, the diol structure also includes at least one imide group.

Another exemplary preferred polymer according to the present invention is a crosslinked polymer comprised of a linear chain polymer formed from a dihydroxy-functionalized polyene-bridged chromophore, a diacid or diacid dichloride and a diol. The crosslinking is realized by thermally induced cyclolization of trifluorovinylethers which are attached to the diol co-monomer and/or chromophore in the linear chain polymer chain. In a preferred embodiment, the diol structure also includes at least one imide group.

Another exemplary preferred polymer according to the present invention is a crosslinked polymer made from crosslinkable star-shaped high molecular weight (larger than 2,000) structure containing polyene-bridged chromophores. In a preferred embodiment, the crosslinking groups are multiple trifluorovinylether groups located at the periphery of the star-shaped structure.

Another exemplary preferred polymer according to the present invention is a crosslinked polymer made from crosslinkable dendritic structure having a chromophore core and one or more dendrons. In a preferred embodiment, the crosslinking groups are multiple trifluorovinylether groups located at the periphery of the dendritic structure.

According to a preferred embodiment of the present photodegradation is eliminated by removing oxygen from the material in the device and from the environment of the device. An exemplary preferred technique for providing this protection according to the present invention is to hermetically package the device in a container filled with an inert gas. Another exemplary preferred technique for providing this protection according to the present invention is to insulate the device from air (oxygen, in particular) by coating the electro-optic device with a polymeric material which has a very low permeativity for oxygen.

The NLO materials of the present invention are suitable for a wide range of devices. Functions performed by these devices include, but are not limited to, the following: electrical to optical signal transduction; radio wave to millimeter wave electromagnetic radiation (signal) detection; radio wave to millimeter wave signal generation (broadcasting); optical and millimeter wave beam steering; and signal processing such as analog to digital conversion, ultrafast switching of signals at nodes of optical networks, and highly precise phase control of optical and millimeter wave signals. These materials are suitable for arrays which can be used for optical controlled phased array radars and large steerable antenna systems as well as for electro-optical oscillators which can be used at high frequencies with high spectral purity.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 5 illustrates the synthesis of an exemplary polyester and its dynamic thermal stability test result according to the present invention;

FIG. 6 illustrates an exemplary preferred method for synthesizing poly(imide-ester) NLO polymer according to the present invention;

FIG. 7 illustrates two exemplary preferred methods for synthesizing diimide-containing diols according to the present invention;

FIG. 8 illustrates the structures of exemplary preferred tetracarboxylic dianhydrides and hydroxyl anilines used for preparation of diimide-containing diols according to the present invention;

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Exemplary Preferred Chromophores Used in Various Polymer Systems

Figure 1:
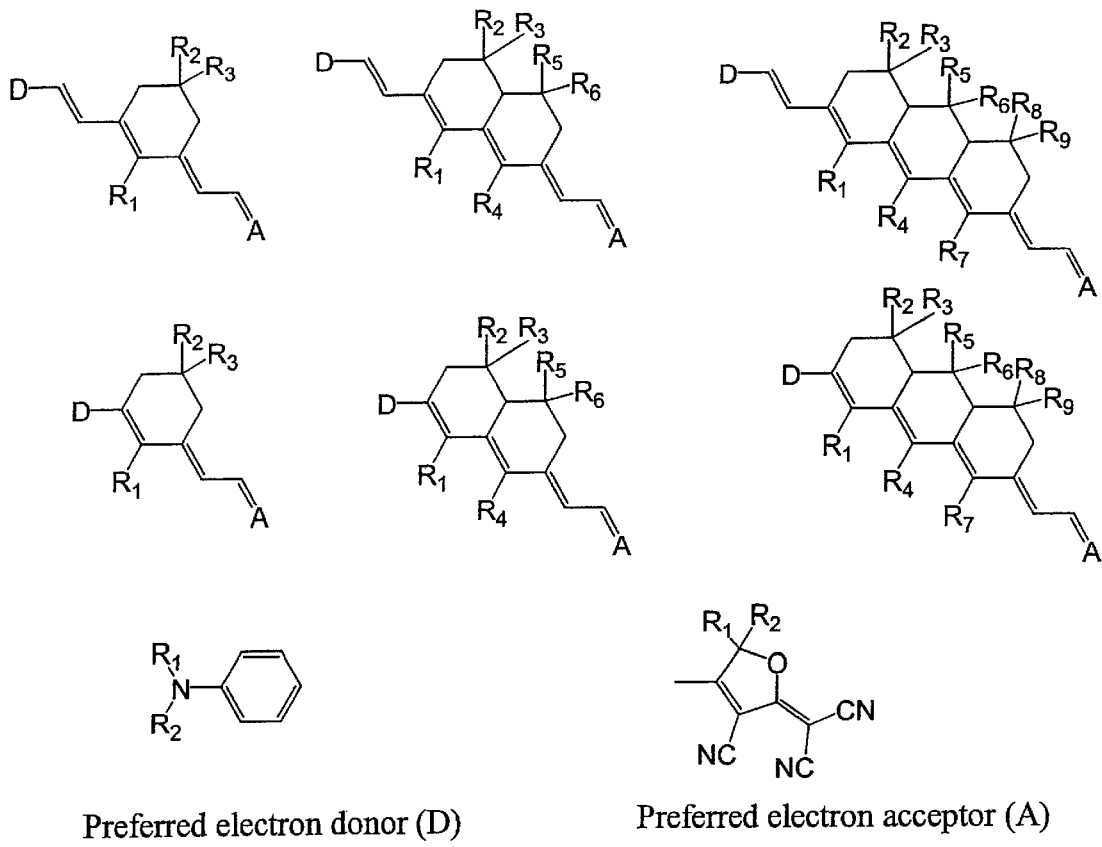
FIG. 1 illustrates the structures of exemplary preferred chromophores for incorporation into various polymers according to the present invention.

Referring to FIG. 1, the structures of exemplary preferred chromophores for incorporation into various polymers in the present invention are shown. These chromophores are disclosed in the above-referenced patent applications, incorporated herein by reference. Referring to FIG. 1, D is an electron donor group, A is an electron acceptor group and R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same. The preferred electron donors are N,N-dialkylaminobenzene, and the preferred electron acceptors are ring-locked tricyano furan derivatives (TCF) as shown also in FIG. 1.

Figure 2:
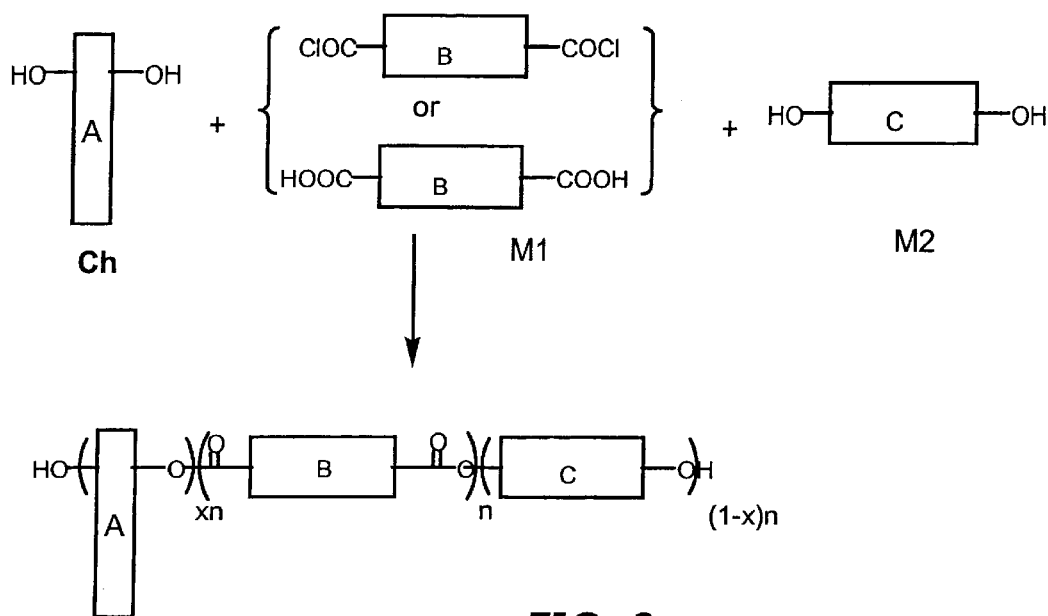
FIG. 2 illustrates the basic structure and an exemplary preferred preparation scheme of linear polyester NLO polymers according to the present invention.

Polyester Incorporating Chromophores With Structures Shown in FIG. 2

Referring to FIG. 2, the basic structure and exemplary preferred preparation scheme of linear polyester NLO polymers are shown. The polyester is formed from the condensation reaction of diacid dichloride and diol-functionalized chromophore and a diol co-monomer. Use of diol co-monomer allows facile adjustment of chromophore loading density. Aliphatic diol on the chromophore is reactive enough to obtain high molecular weight polymer. However, it is preferred to have two aromatic alcohols on the chromophore to ensure similar reactivity to aromatic alcohol co-monomer. It has been observed that the synthetic reaction shown in FIG. 2 is mild enough for high $\mu\beta$ chromophores (such as those shown in FIG. 1) to survive the polymerization. The polyesters can also be formed by using diacid instead of diacid dichloride by using appropriate catalyst and longer reaction time.

Figure 3:
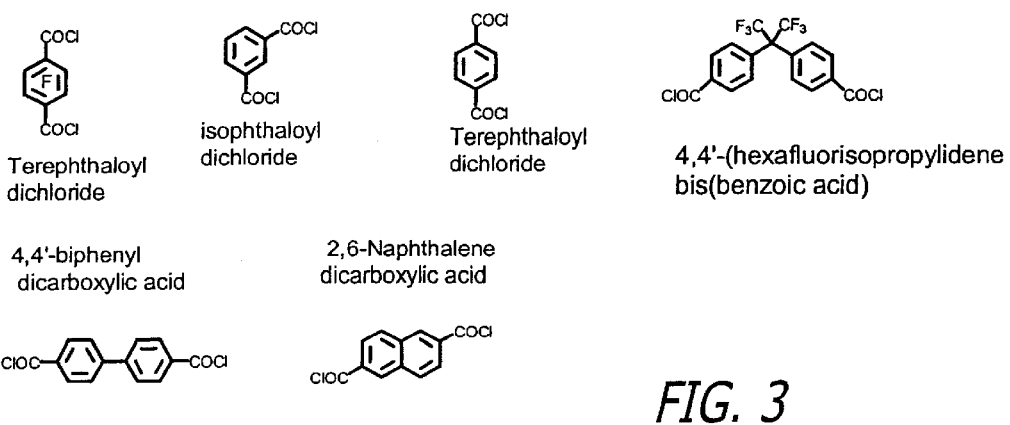
FIG. 3 illustrates the structures of exemplary preferred diacid dichloride compounds for polyester preparation according to the present invention.
Figure 4:
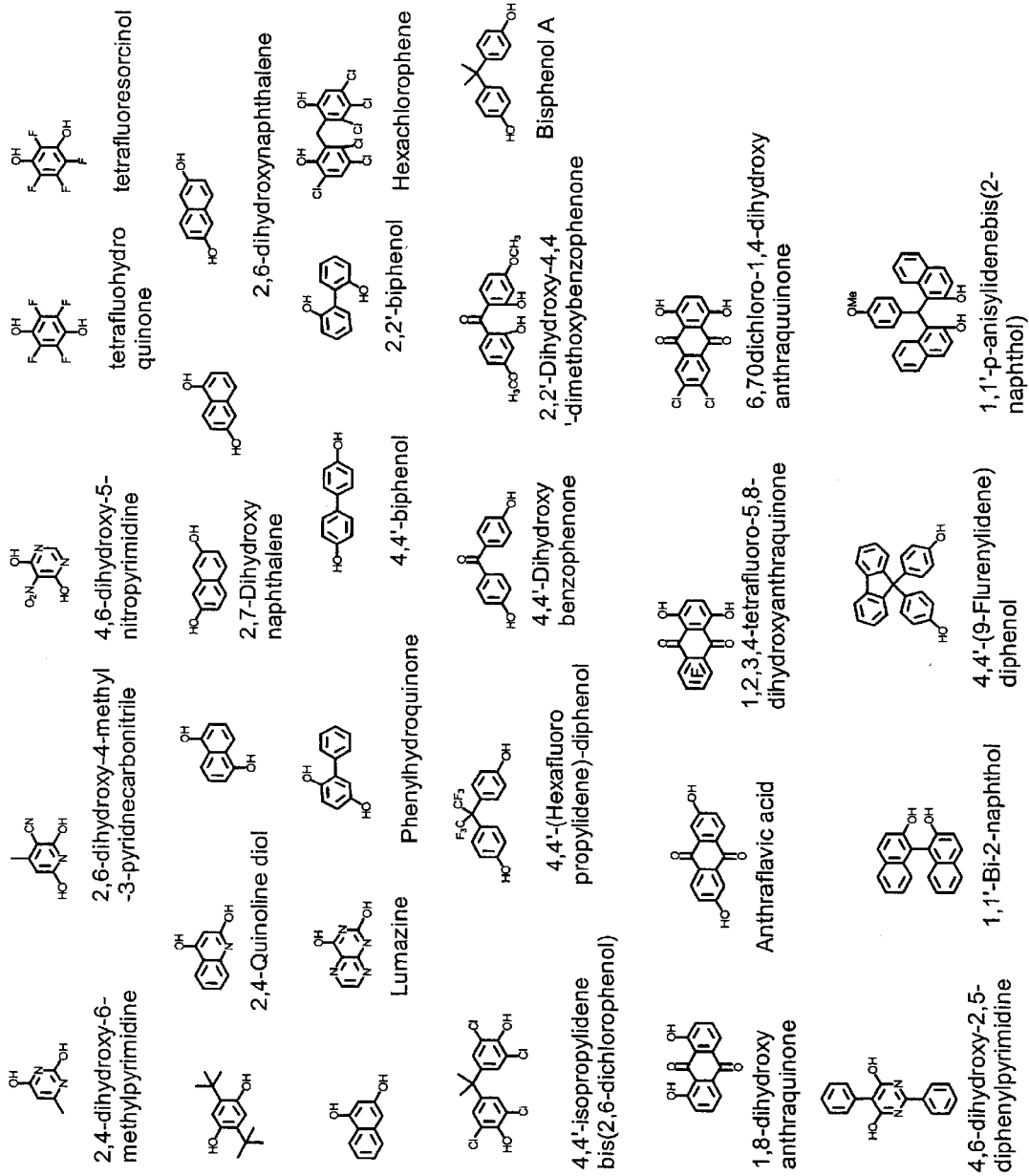
FIG. 4 illustrates the exemplary preferred structures of diols for polyester preparation according to the present invention.

Exemplary preferred structures for diacid dichloride compounds for polyester preparation are shown in FIG. 3. It should be understood that their corresponding diacids can also be used. Structures of exemplary preferred diols for polyester preparation are shown in FIG. 4. Some of the compounds are partially halogenated, thus providing lower intrinsic optical loss at 1.3 $\mu$m and 1.55 $\mu$m due to their lower content of C—H group.

Referring to FIG. 5, an example of soluble polyester according to the present invention is shown. The polyester was spin-casted onto an ITO-coated glass substrate. The dried film was electrically poled and the dynamic stability of poling-induced chromophore alignment was measured by second-harmonic generation as a function of ramping temperature. A stability of 120° C. was obtained and shown also in FIG. 5. The detailed synthesis of the polyester is given below.

Synthesis of A Polyester Containing CLD-5

In dry box, 0.123 g of tetrafluoroisophthaloyl dichloride, 52 mg of CLD-5 (the chromophore shown in FIG. 5), 2 ml of THF, 21 mg of NEt$_3$ (1.2 eq. to CLD-5) were mixed in a 16 ml vial. The mixture was stirred at 30° C. for 10 h. The reaction of CLD-5 with the dichloride was complete as determined by thin layer chromatography. 123 mg of 4,4-(hexafluoroisopropylidene) diphenol and 70 mg of NEt$_3$ were then added. 26 h later, 10 ml of MeOH was added slowly into the vial. The resulting mixture was frozen for 1h. The precipitate was collected by filtration and was then re-dissolved in CH$_2$Cl$_2$. MeOH was added to the CH$_2$Cl$_2$ solution to precipitate out the polymer. The polymer was collected by filtration. The polymer had a molecular weight ($M_w$) of 9,765 and could be easily dissolved in C$_2$H$_4$Cl$_2$ to give 10 wt/vol % solution. Optical quality films were obtained by spin-coating the solution on ITO-glass substrates. The index of the film is 1.61 at 1.3 $\mu$m as measured by eliposometry.

The chromophore loading level in the above example is 19.6 wt %, however, the weight percentage loading of chromophore can be adjusted by using co-monomers of different molecular weight and by adopting different molar ratio of the diol co-monomer and the chromophore.

A blank polyester, i.e. without using the chromophore CLD-5, was also prepared in a similar manner, a $M_w$ (47,981) of almost 5 times of that of the CLD-5-containing polyester was obtained.

Poly[imide-ester]

Polyimides are well known for their high glass transition temperatures ($T_g$) and have been studied intensively for incorporation of second-order NLO chromophores for electro-optic applications. However, due to their harsh reaction/processing conditions, no high $\mu\beta$ (larger than 10,000 at 1.9 $\mu$m) chromophores have been reportedly incorporated into polyimide. In the present invention, a new class of hybrid poly[imide-ester], is described. The basic structure of the poly[imide-ester] is similar to the polyester structure as shown in FIG. 2, however, the diol co-monomer now contains a diimide structure. The new approach takes advantage to the rigidity of imide without facing the harsh condition of imide polymerization. An exemplary preferred synthesis of poly(imide-ester) NLO polymer is illustrated in FIG. 6. The polymerization reaction condition exactly follows the condition described above for polyester synthesis. The exemplary preferred method for synthesis of diimide-containing diol is shown in FIG. 7 and the details are described below.

Synthesis of Diimide-containing Diol:

Diimide diol A: To a solution of 5 g, 11.3 mmol of 4,4'-(hexafluoro isopropylidene) diphthalic dianhydride in 30 ml of anhydrous THF was added a solution of 2.05 eq, 23.07 mmol, 4.107 g of 4-amino-2,6-dichlorophenol in 10 ml THF. The reaction was exothermic, and the mixture turned dark brown. When heat subsided, THF was removed by rotary evaporation. The residue was then heated in a 230° C. oil bath until no water vapor was coming out (for approximately 1 hour). Add 30 ml of acetone, stir overnight to dissolve impurities. The product was collected by filtration. Product is soluble in acetone, EtOAc, and CH2Cl2. Condense the filtrate to get more product. Combine the two crops, do a Recrystallization from acetone to afford 7 g of product. Dissolve the product in 250 ml of EtOAc with heating, wash with dilute NaHCO3, then add dilute solution of 1 eq K2CO3. The product went into water phase which became purple red. Discard the EtOAc. Extract the water phase with 50 ml EtOAc and discard the EtOAc.

Add 200 ml of EtOAc, acidify with conc. HCl to pH=2. Discard the water, wash with dilute brine twice. The EtOAc phase was dried over $MgSO_4$, condensed and dried by heating and melting the product in 210° C. under high vacuum. Yield: 4.5 g off white crystals with a m.p. of 290.5–291.5° C. HNMR in $C31H12Cl4F6N2O6$: C 48.72; H 1.58; Cl 18.56; N 3.67. Found: C 48.52; H 1.65; Cl 18.38; N 3.62.

Diimide diol B: Prepared in a similar manner using corresponding starting materials. NMR: 9.98 ppm(s, 2H), 8.49 ppm(s, 2H), 8.35 ppm(d, 2H, J=8.2 Hz), 7.7–5.58 ppm(m, 4H), 7.29–7.20 ppm(m, 4H), 6.97 ppm(d, 2H, 7.2 Hz). This diol is much less soluble in acetone than the diol A. However, it can be easily dissolved in DMF.

Referring to FIG. 8, structures of exemplary preferred tetracarboxylic dianhydrides and hydroxyl anilines used for preparation of diimide-containing diols are shown. These dianhydrides and anilines can be combined into a large number of diimide-diols, providing great flexibility in selection of monomer with desired rigidity. Some of the compounds are partially halogenated, thus providing lower intrinsic optical loss at 1.3 μm and 1.55 μm.

Crosslinded Polyesters and poly[imide-ester]

Chromophore covalently incorporated linear polyesters and poly[imide-ester]s typically have dynamic stabilities around 120–130° C. Although such stability would allow their EO devices to work at room temperature for as long as one year, it is not good enough for many commercial applications. The thermal stability of the linear polymer approach is limited by solubility considerations which preclude the use of very rigid monomers.

Figure 9:
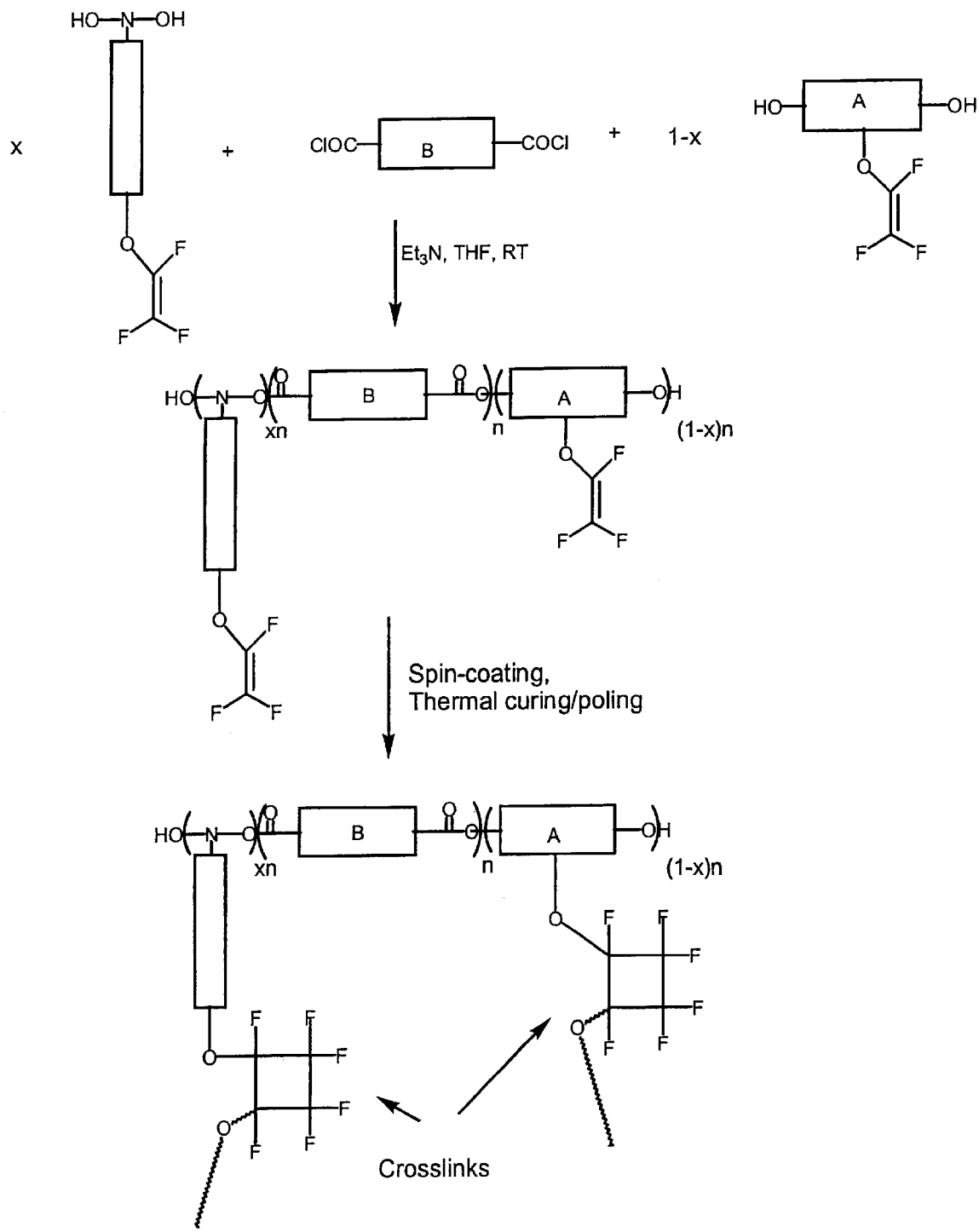
FIG. 9 illustrates an exemplary preferred basic synthetic scheme of crosslinked polyesters or poly(imide-ester)s according to the present invention.

In the present invention, the thermal stability of NLO polymers is further increased by locking both chromophores and linear polymer chains through crosslinking sites on the one end of chromophore and on the polymer chains. It has been observed in polyurethane NLO materials that locking one more end of chromophore can bring a 20–30° C. increase in thermal stability, that crosslinking of linear chains can bring another 30° C. increase in thermal stability. In the present invention, trifluorovinylether group is attached to both diol-functionalized chromophores and diol/imide-diol comonomers for crosslinking. This crosslink group is selected for three reasons. First, it helps reduce overtone absorption of C—H bond at 1.3 μm and 1.55 μm due to the introduction of C—F bonds; second, the crosslinking reaction between trifluorovinylether groups takes places at reasonably high temperatures (160–180° C.); third, its thermally induced radical cyclization reaction is compatible with high μβ chromophores. Referring to FIG. 9, an exemplary preferred basic synthetic scheme of crosslinked polyesters or poly(imide-ester)s is shown.

Figure 10:
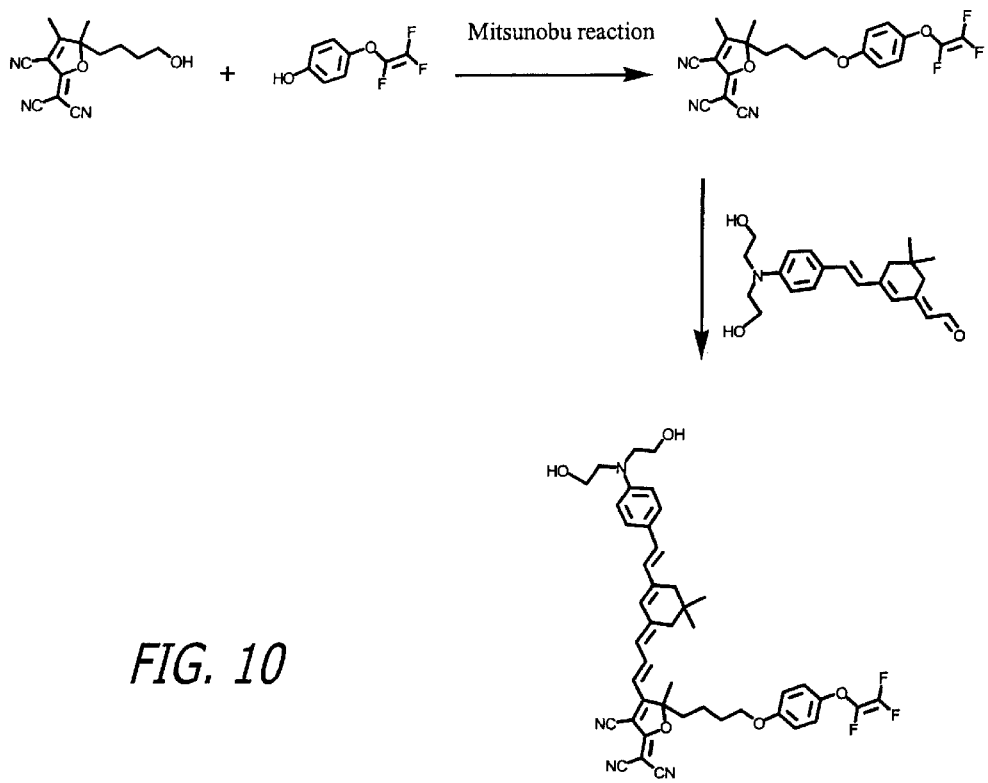
FIG. 10 illustrates the synthetic scheme of an exemplary preferred dihydroxyl chromophore carrying a thermally crosslinking trifluorovinylether group according to the present invention.
Figure 11:
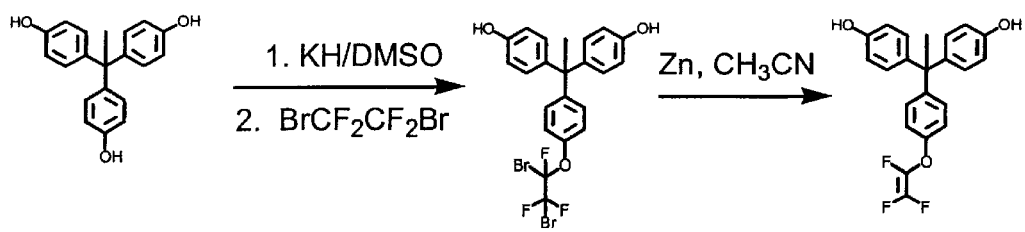
FIG. 11 illustrates the synthetic scheme of an exemplary preferred aromatic diol functionalized with a crosslinking trifluorovinylether group according to the present invention.

Referring to FIG. 10, a synthetic scheme of an exemplary preferred dihydroxyl chromophore carrying a thermally crosslinking trifluorovinylether group is shown. Referring to FIG. 11, a synthetic scheme of an exemplary preferred trifluorovinylether functionalized aromatic diol is shown. The linear polymerization of these two units and a diacid dichloride follows the procedure described above in the Polyester discussion. Non-crosslinking diol monomers (such as those shown in FIGS. 4 and 7) can be used to fine tune the crosslinking density and other properties (such as poling efficiency, optical loss). The linear polyesters are soluble in common organic solvents due to fluorinated side groups on the polymer chains.

Star-Shaped Crosslinkable Macromolecules
Containing Multi-Chromophores

Figure 12:
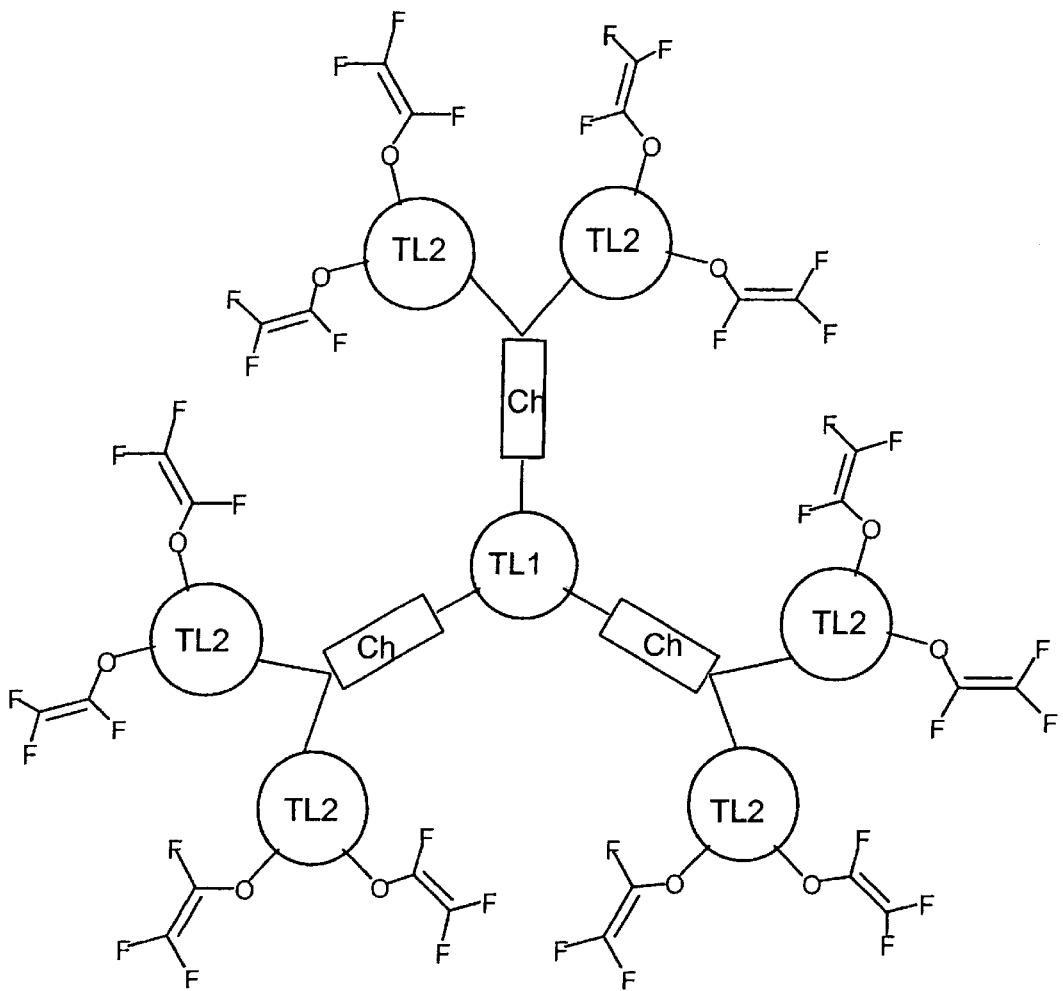
FIG. 12 illustrates the basic structure of star-shaped macromolecules including a trilink core (TL1), three trilink chromophores (Ch), six trilinkers (TL2), and twelve crosslinking trifluorovinylether groups at the periphery according to the present invention.

Referring to FIG. 12, the basic structure of star-shaped macromolecules according to the present invention is shown. The macromolecular structure includes a trilink core (TL1), three trilink chromophores (Ch), six trilinkers (TL2), and twelve crosslinking trifluorovinylether groups at the periphery. The molecular weight of such structure is in the range of 3,000 to 8,000, therefore, optical-quality thin films can be prepared by spin-casting a solution of the pure compounds without the need for host polymers. This new approach of film preparation eliminates the phase separation problem since there is only one component existing, and thus is expected to provide very low optical loss NLO materials. Preferably, the films of the macromolecule are poled and thermally cured simultaneously. Due to the high crosslink density of the macromolecule and double-end cross-linking of chromophore, the induced chromophore dipoles in the cured films are expected to have very high thermal stability.

Figure 13:
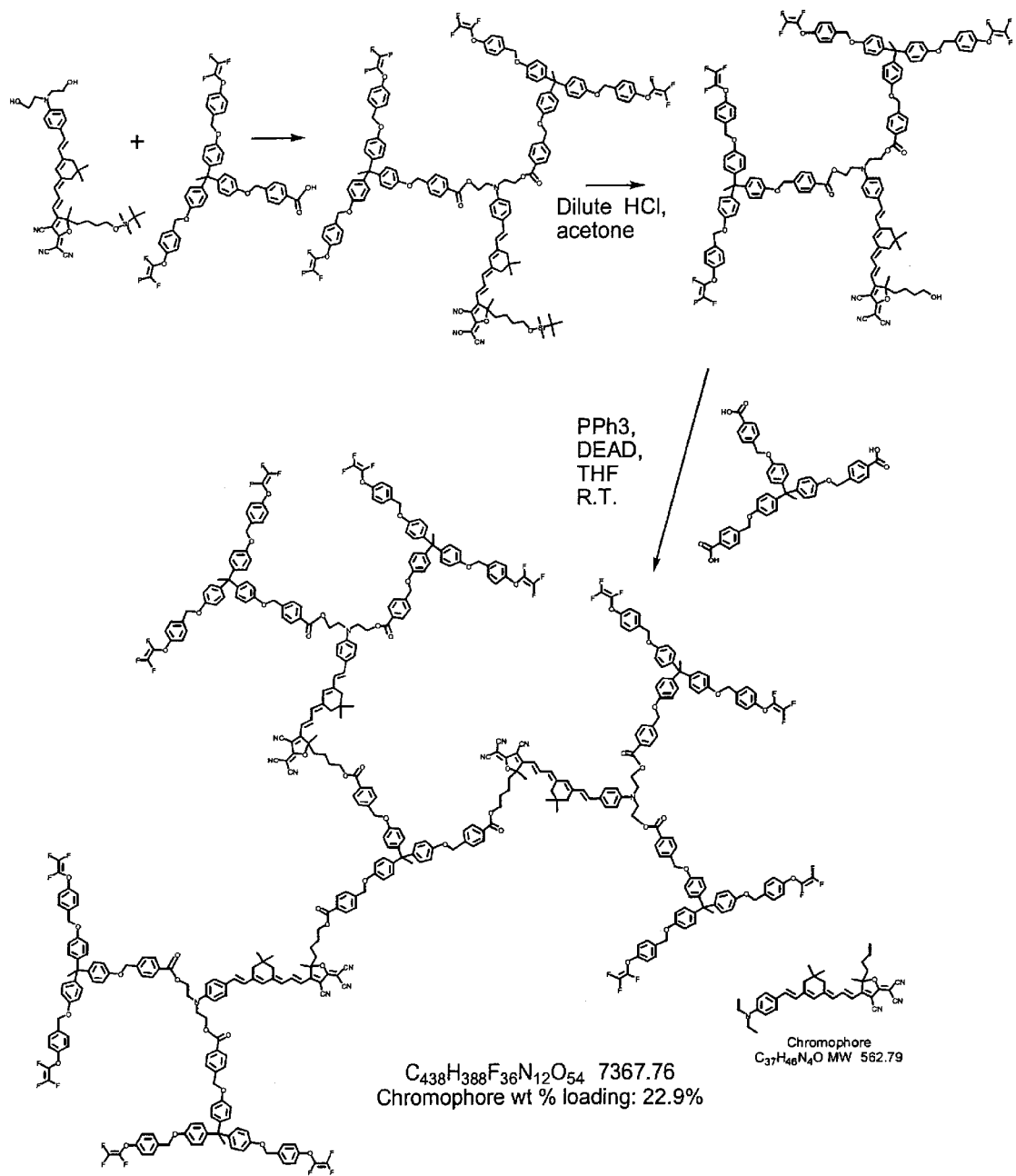
FIG. 13 illustrates an exemplary preferred star-shaped macromolecule with the structure depicted in FIG. 12 and its exemplary preferred synthetic scheme according to the present invention.

Referring to FIG. 13, an exemplary preferred star-shaped macromolecule and its exemplary preferred synthetic scheme are shown. The chromophore is tri-hydroxy functionalized, with the acceptor-end hydroxy temporarily protected by t-butyldimethylsilyl (TBDMS) group. The two free hydroxy groups are condensed with carboxylic acid-functionalized dendrons which carry four tritluorovinylether groups at the ends. The TBDMS protecting group in the resulting larger dendron is removed for condensation with tricarboxylic acid functionalized core. The final macromolecule contains three chromophore molecules and twelve trifluorovinylether groups, and has a molecular weight as high as 7,368 and a chromophore loading of 22.9 wt %.

Figure 14:
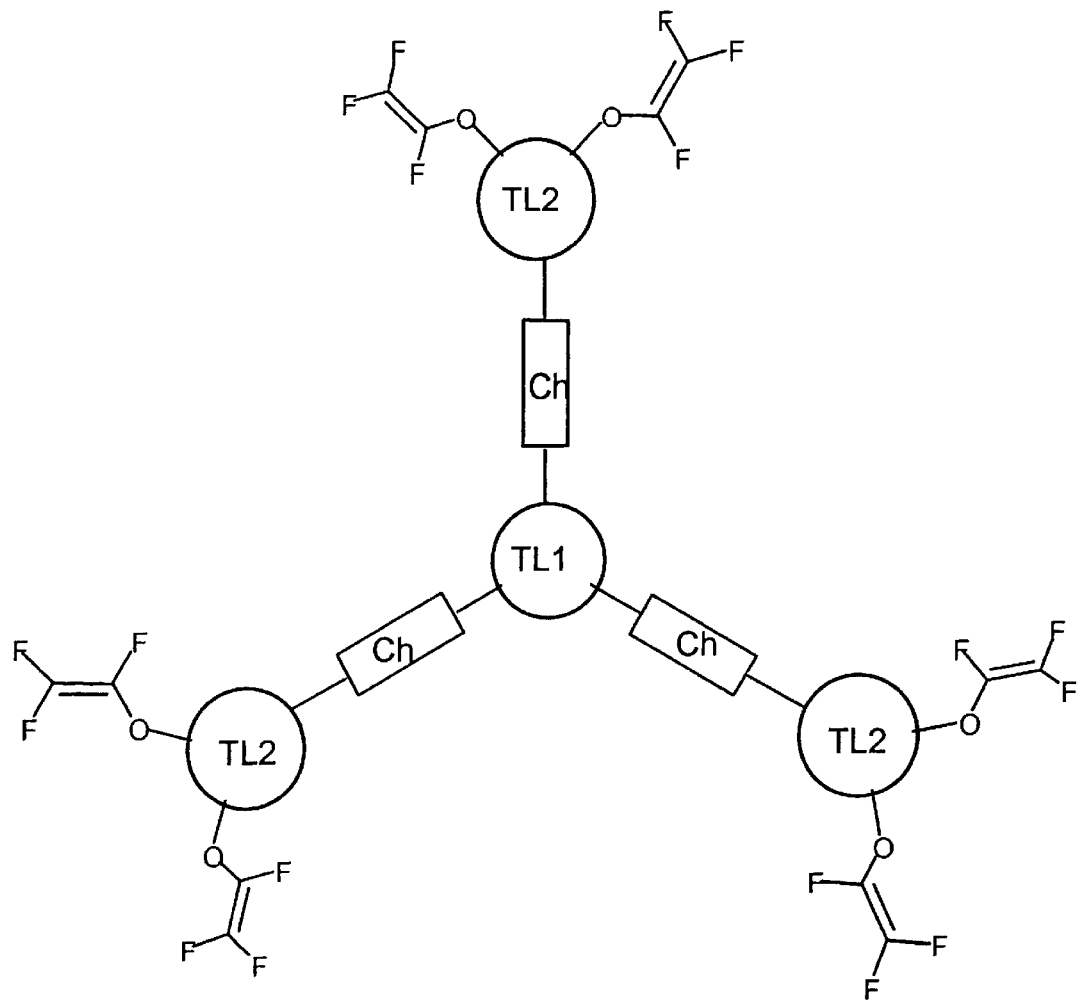
FIG. 14 illustrates the basic structure of star-shaped macromolecules including a trilink core (TL1), three dilink chromophores (Ch), six trilinkers (TL2), and six crosslinking trifluorovinylether groups at the periphery according to the present invention.
Figure 15:
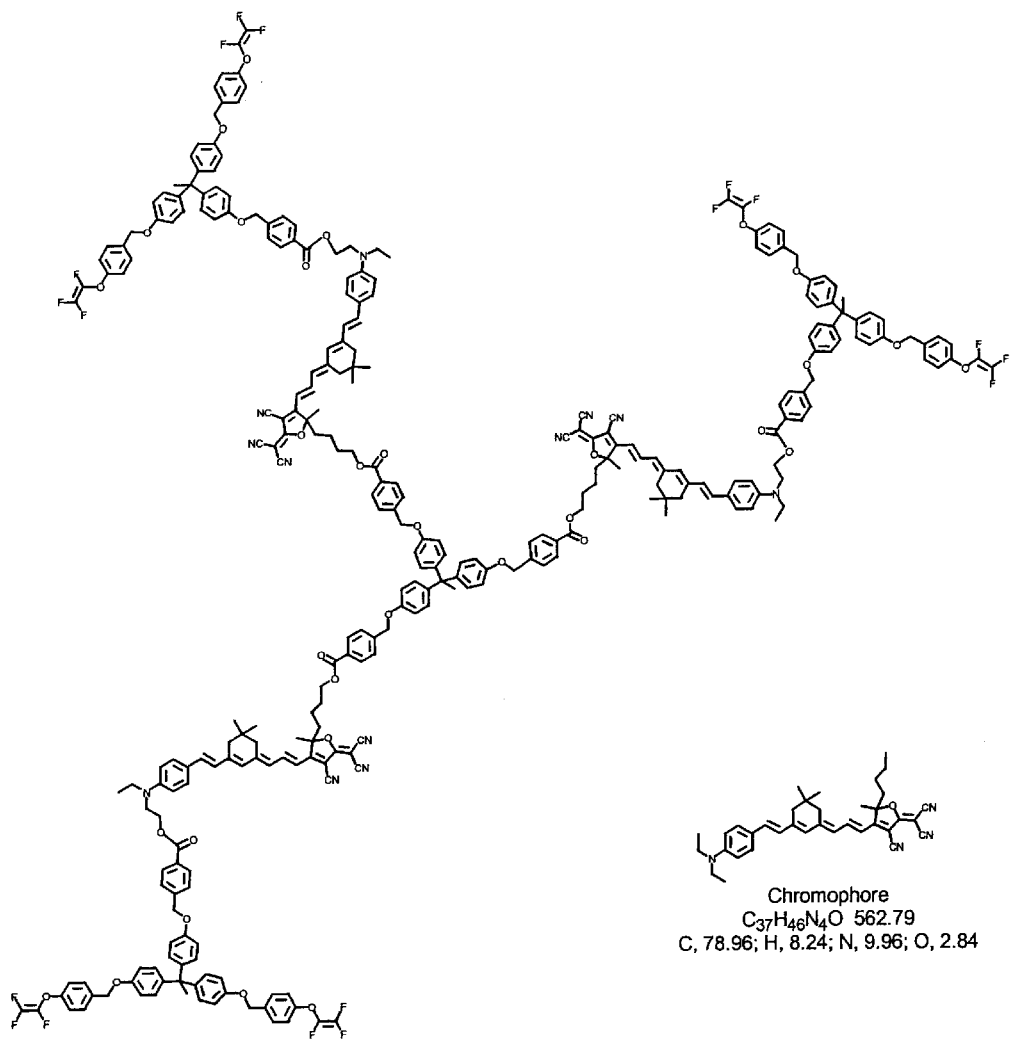
FIG. 15 illustrates an exemplary preferred star-shaped macromolecule with the structure depicted in FIG. 14 according to the present invention.

Referring to FIG. 14, an alternative structure of star-shaped macromolecule is shown. It includes a trilink core (TL1), three dilink chromophores (Ch), six trilinkers (TL2), and six crosslinking trifluorovinylether groups at the periphery. The major difference between this structure and the one shown in FIG. 12 is that the chromophore is now dilinkable instead of trilinkable. It has been observed that the dilinked chromophore is easier to pole than its trilinked version. Therefore, this structure may afford higher poling efficiency with some sacrifice on thermal stability. Referring to FIG. 15, an exemplary preferred macromolecule of the structure of FIG. 14 is shown.

Star-shaped Crosslinkable Macromolecules
Containing One Chromophore as the Core

Figure 16A:
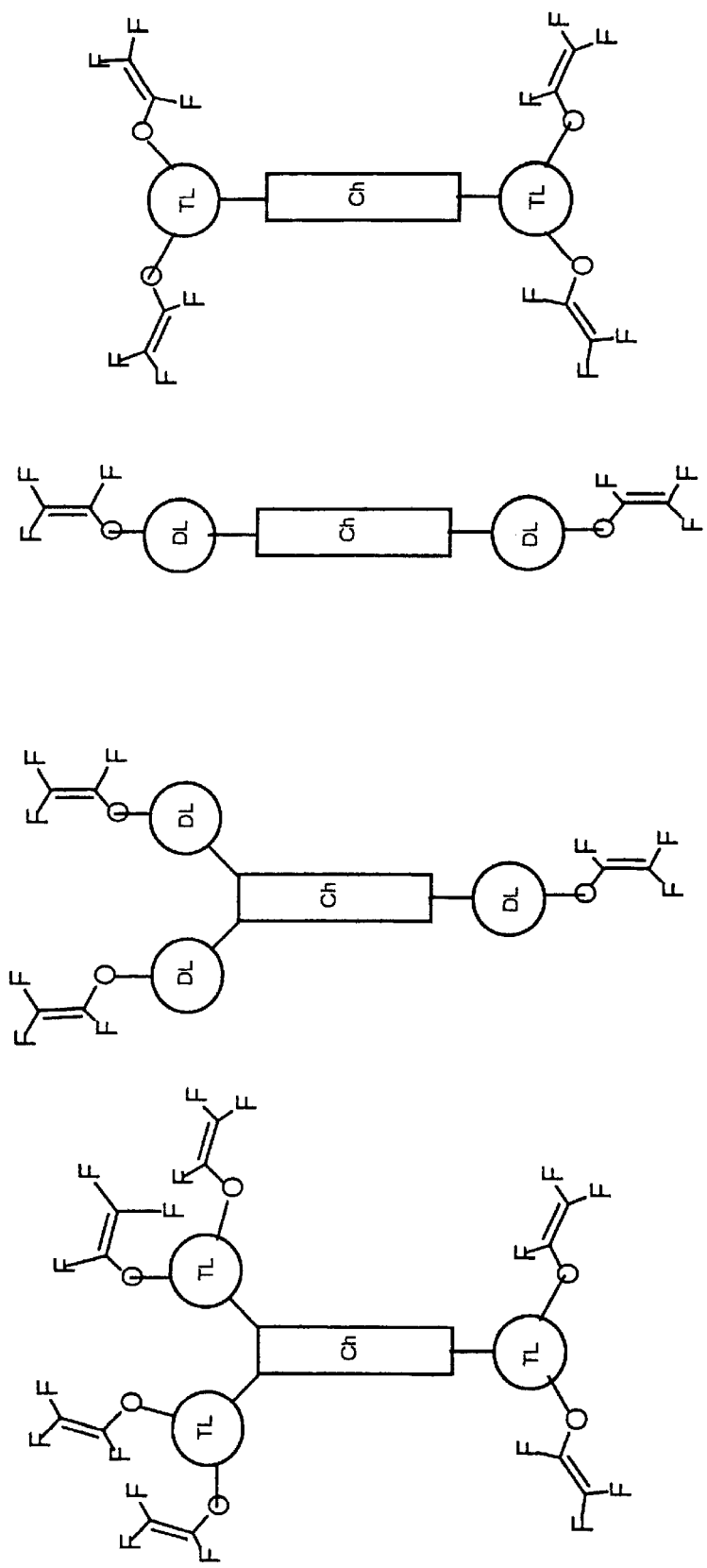
FIG. 16A illustrates exemplary preferred basic structures of chromophore-core star-shaped NLO molecules according to the present invention.
Figure 16B:
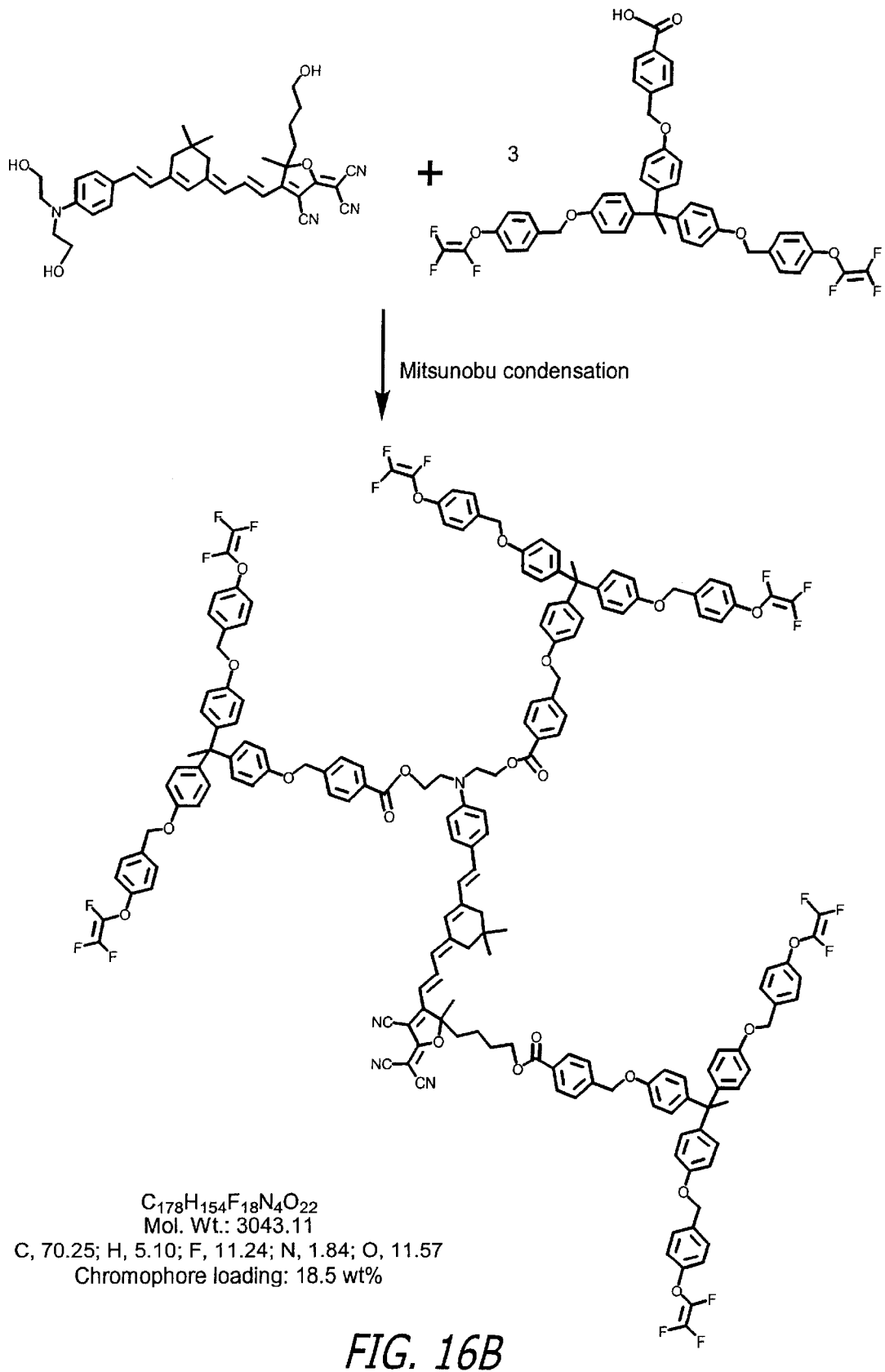
FIG. 16B illustrates the structure of an exemplary preferred chromophore-core star-shaped macromolecule and its synthetic scheme according to the present invention.

Referring to FIG. 16A, the basic structures of chromophore-core star-shaped macromolecules are shown. In these macromolecules, chromophores are functionalized with two, three or four trifluorovinylether crosslinkers. The linkages between the chromophore and the trifluorovinylether end groups (DL and TL) function as spacers between chromophores in the final thermoset polymer matrix. Molecular weight (MW) and chromophore wt% content of the macromolecule can be adjusted by using DL and TL of different size. The solution of the macromolecule can be spin-casted onto substrates to form good quality thin films without using a host polymer when the molecular weight of the macromolecule is made above 2,000. When its MW is lower, the macromolecule can be mixed with a host polymer to spin-cast film. In this case, the host polymer is preferably functionalized with the same crosslinking groups, i.e. trifluorovinylether. Thus, in these exemplary preferred structures, the chromophore core is modified with two, three or four dendrons, each carrying one or two trifluorovinylether as crosslinkers. Referring to FIG. 16B, the structure of an exemplary preferred chromophore-core star-shaped macromolecule and its synthetic scheme are shown.

The organic chromophores of the present invention exhibit exceptional molecular optical nonlinearity, thermal stability, and low optical absorption at communication wavelengths. The chromophore materials of the present invention are suitable for processing into hardened polymers for electro-optic devices. These materials can be employed not only in conventional electro-optic modulator device configurations but also in devices employing a constant bias field which permits the full potential of the materials to be demonstrated.

Figure 17:
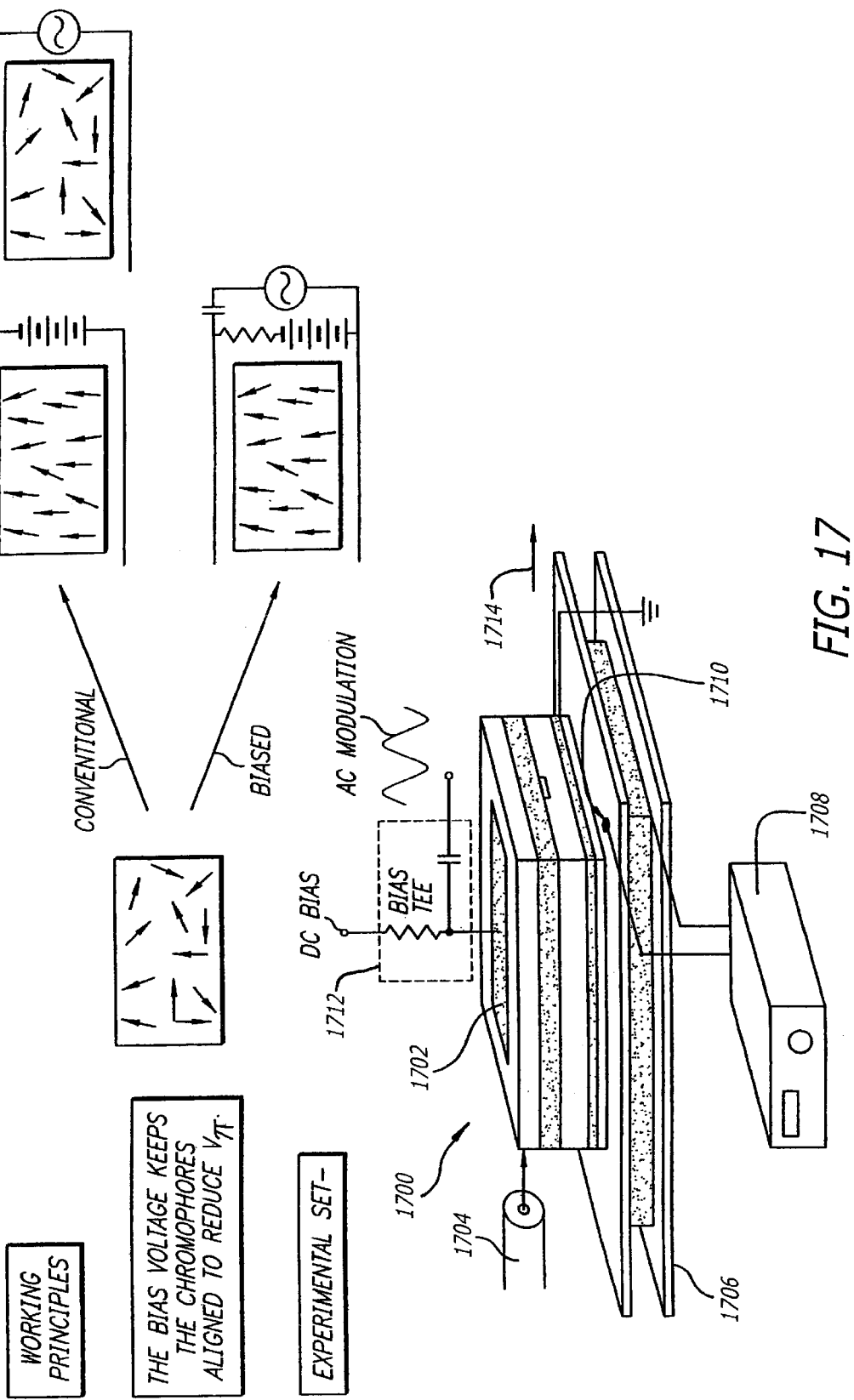
FIG. 17 illustrates an exemplary preferred electro-optic device employing a constant electric field bias, the device incorporating a chromophore material the present invention.

Referring to FIG. 17, an exemplary preferred electro-optic device 1700 employing a constant electric field bias is illustrated. The illustrated electro-optic device 1700 includes a modulator chip 1702, a fiber 1704, a thermoelectric cooler 1706, a temperature controller 1708, a thermister 1710, and a bias tee 1712 (including a resistor and a capacitor) configured as shown providing a light output indicated by arrow 1714.

Figure 18:
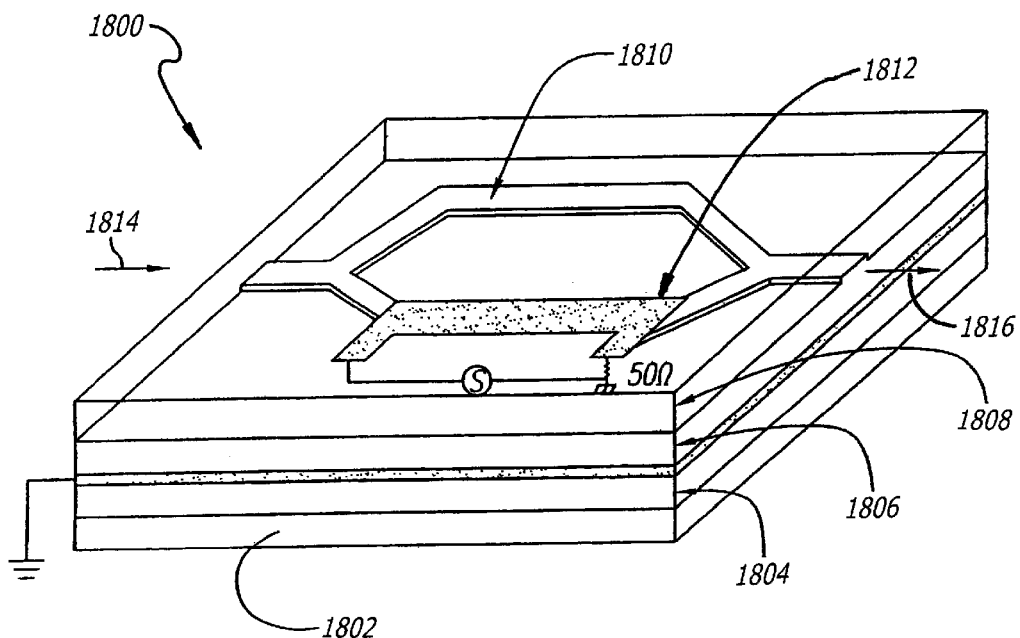
FIG. 18 illustrates an exemplary preferred Mach Zehnder modulator incorporating a chromophore material of the present invention.

Referring to FIG. 18, an exemplary preferred Mach Zehnder modulator 1800 incorporating a chromophore material of the present invention is illustrated. The illustrated modulator 1800 includes a Si substrate 1802, an Epoxylite (3 µm) layer 1804, a PU-chromophore (1.5 µm) layer 1806, a NOA73 (3.5 µm) layer 1808, a waveguide 1810 and an electrode 1812 configured as shown with light indicated by arrows 1814, 1816.

Figure 19:
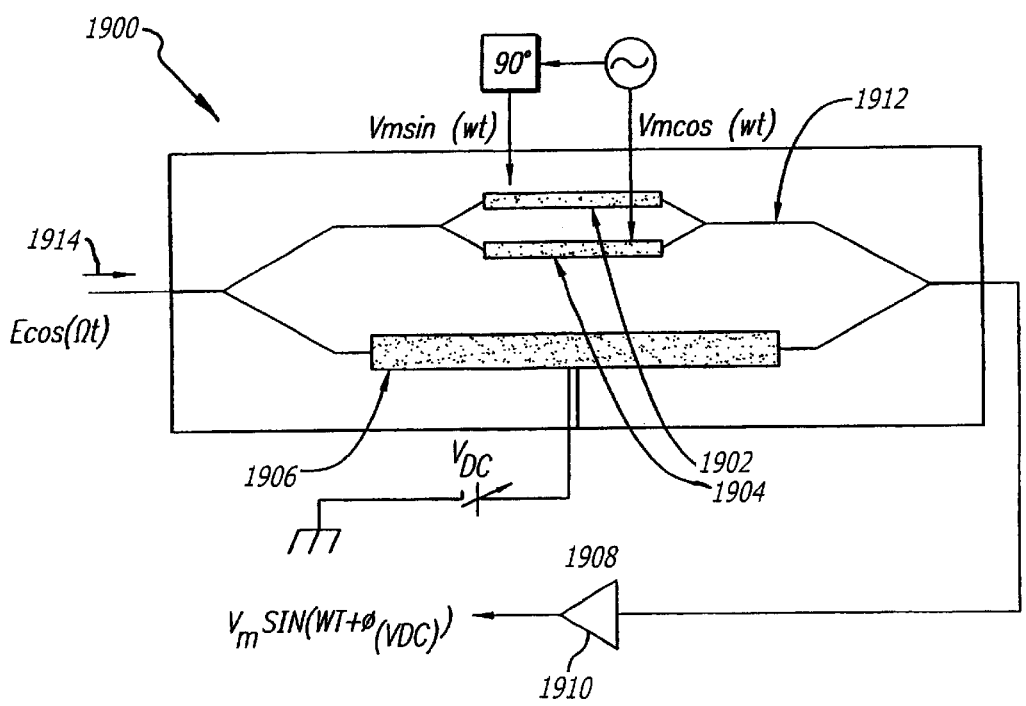
FIG. 19 illustrates the use of a chromophore material of the present invention (in the form of microstrip lines) in a microwave phase shifter of the type employed in optically controlled phased array radars.

Referring to FIG. 19, the materials of the present invention are shown in the form of microstrip lines in an exemplary preferred microwave phase shifter 1900 of the type employed in optically controlled phase array radars. The illustrated microwave phase shifter 1900 includes microstrip lines 1902, 1904, a DC control electrode 1906, a DC source 1908, a photodetector 1910 and an optical waveguide 1912 configured as shown with light indicated by arrow 1914.

Figure 20:
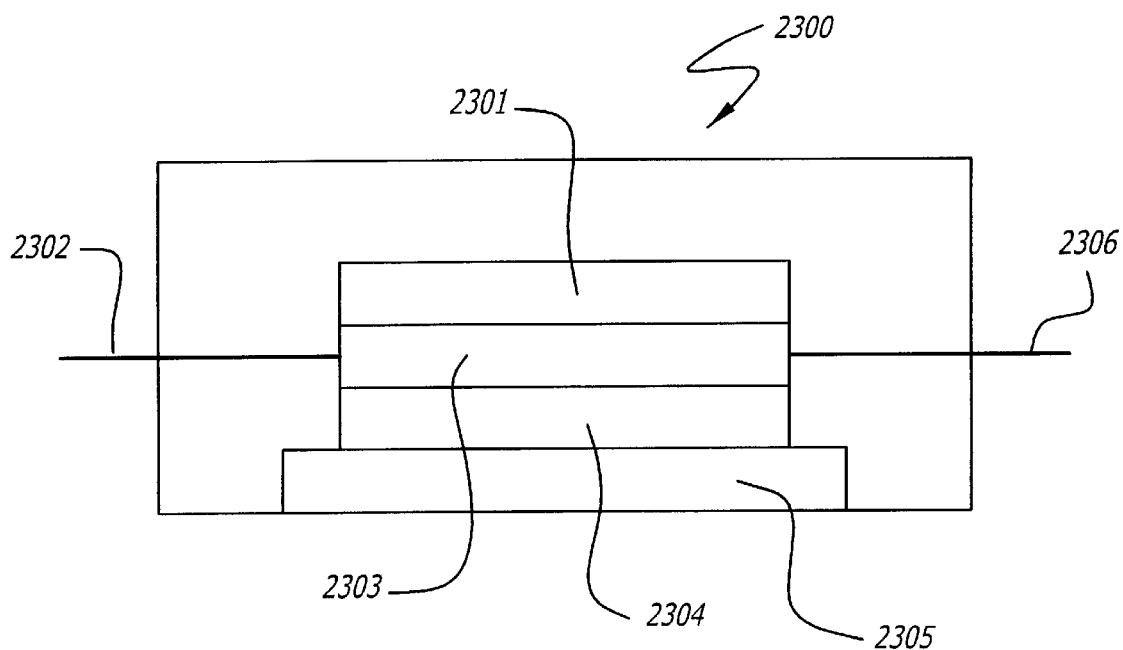
FIG. 20 illustrates an electro-optic device hermetically packaged within a container according to the present invention.

Referring to FIG. 20, an electro-optic device is shown hermetically packaged within a container 2300 according to the present invention. The electro-optic device includes an upper cladding 2301, an input fiber 2302, a waveguide 2303, a lower cladding 2304, a substrate 2305 and an output fiber 2306 configured as shown with the container 2300 positioned thereabout. For the sake of clarity, electrodes and other conventional structures are not shown. In an exemplary preferred embodiment, the electro-optic device is hermetically packaged in a gastight container 2300 (e.g., a metal casing) which is vacuumed or, alternatively, vacuumed and then filled with an inert gas including one or more of: nitrogen, helium, neon, argon, krypton and xenon. The principles of the present invention are applicable to any polymeric electro-optic device which operates in an (artificially created) oxygen-free environment.

Figure 21:
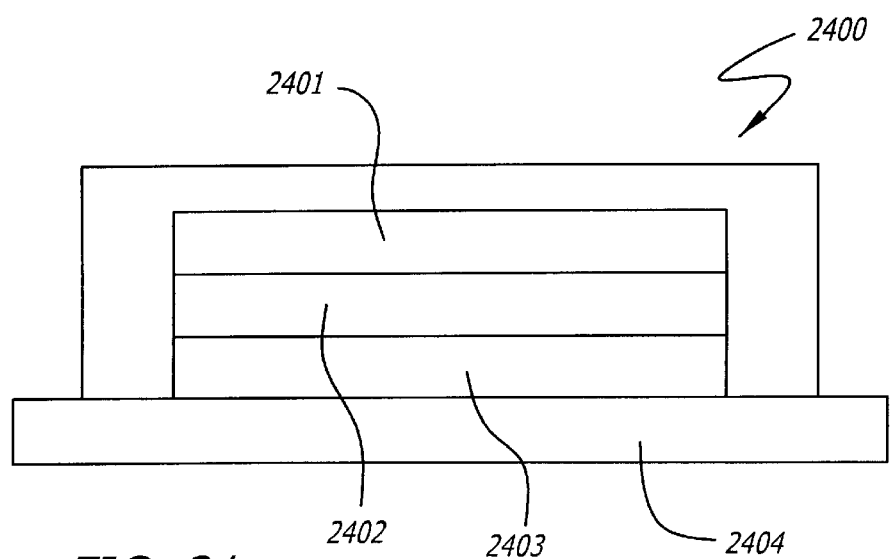
FIG. 21 illustrates an electro-optic device hermetically sealed with a protective coating according to the present invention.

Referring to FIG. 21, an electro-optic device is shown hermetically sealed with a protective coating 2400 according to the present invention. The electro-optic device includes an upper cladding 2401, a waveguide 2402, a lower cladding 2403 and a substrate 2404 configured as shown with the protective coating 2400 positioned thereabout. For the sake of clarity, electrodes and other conventional structures are not shown. The protective coating 240 comprises a material with a low oxygen permeativity which prevents oxygen from entering into the device environment. In an exemplary preferred embodiment, the electro-optic device is hermetically sealed with a UV curable polymer such as UV-15 or epoxy polymer. The principles of the present invention are applicable to sealing polymeric electro-optic devices with any coating material which has a sufficiently low oxygen premeditative to prevent oxygen from entering into the device environment Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

We claim:

1. A second-order nonlinear optical device comprising an active element including a linear chain NLO polyester formed according the following preparation scheme:

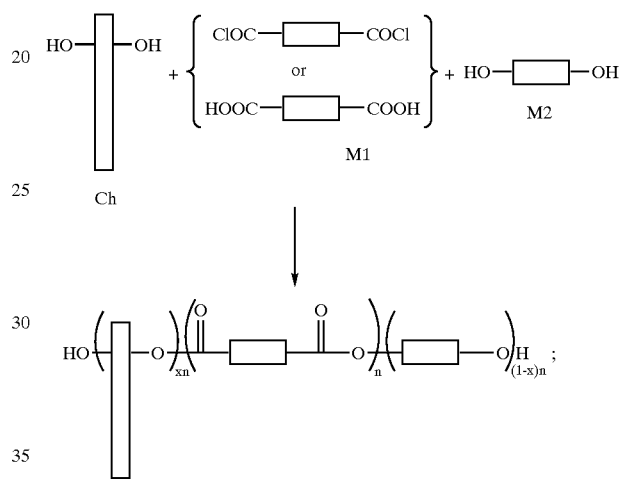

wherein Ch is a dihydroxy functionalized chromophore containing a π-conjugate polyene structure as the bridge or part of the bridge that connects the electron donor and electron acceptor, and the polyene structure is formed as

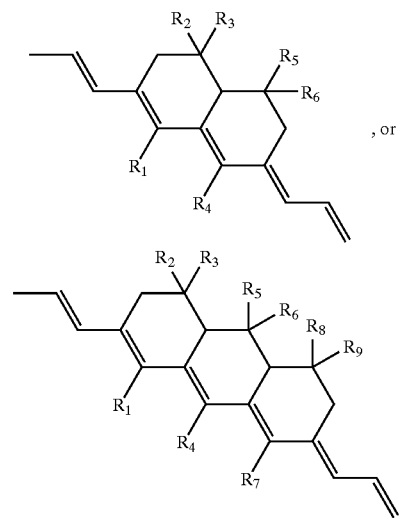

wherein $R_1$–$R_9$=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;

wherein the monomer M1 is an aromatic or aliphatic diacid or diacid dihalide;

wherein the monomer M2 is an aromatic or aliphatic diol;

wherein n is the degree of polymerization;

wherein x defines the molar ratio between Ch and M1, with the loading level of Ch being tuned by the molar ratio.

2. A second-order nonlinear optical device comprising an active element including a linear chain NLO poly[imide-ester] formed as:

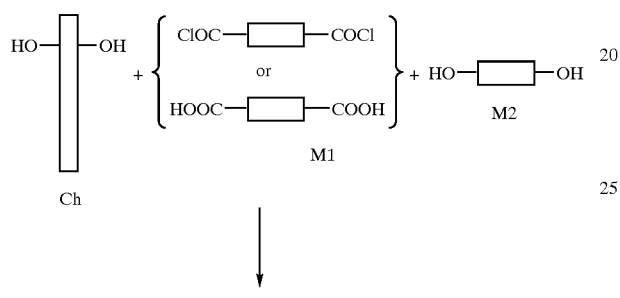

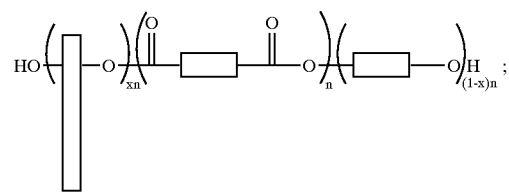

wherein the chromophore Ch is any second-order NLO chromophore functionalized with two hydroxy groups;

wherein the monomer M1 is an aromatic or aliphatic diacid or diacid dihalide;

wherein the monomer M2 is an aromatic or aliphatic diol containing a diimide group, formed from the reaction of an aromatic dicarboxylic dianhydride and two equivalent of amino alcohol;

wherein n is the degree of polymerization;

wherein x defines the molar ratio between Ch and M1, with the loading level of Ch being tuned by the molar ratio.

3. A second-order nonlinear optical device comprising an active element including a linear polyester crosslinked by trifluoroether according to the following preparation scheme:

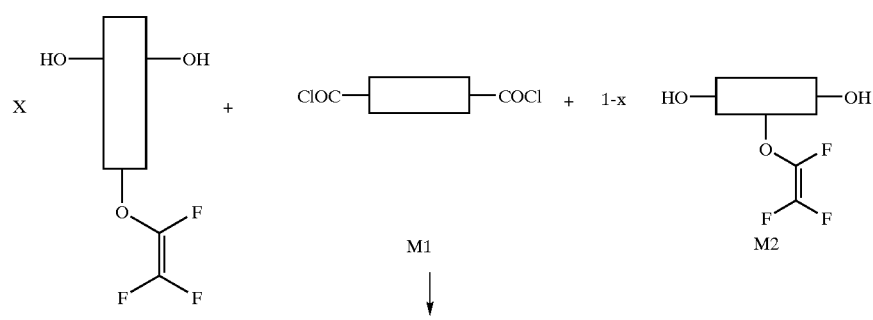

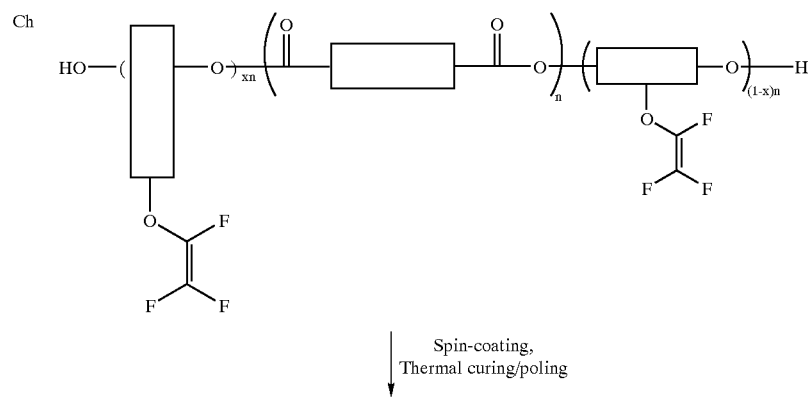

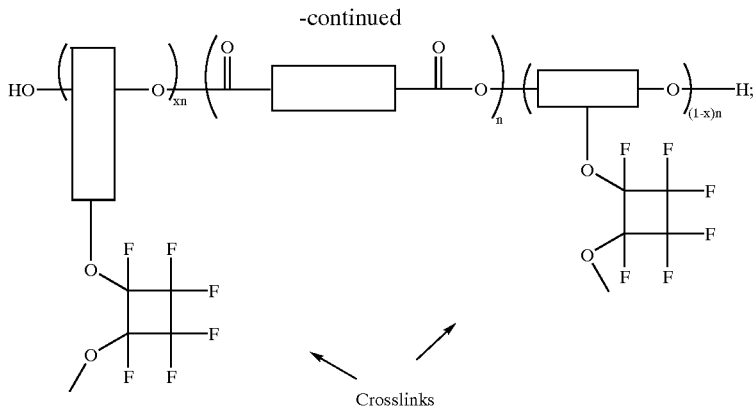

-continued

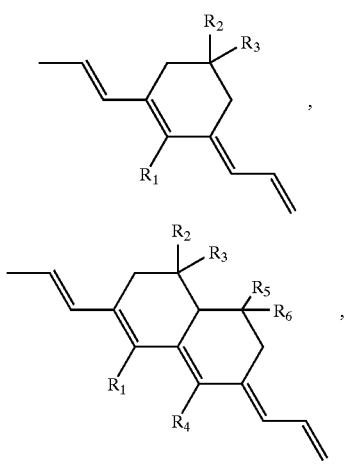

↖ ↗
Crosslinks wherein the chromophore Ch is a second-order NLO chromophore functionalized with two hydroxy groups;

wherein the monomer M1 is an aromatic or aliphatic diacid or diacid dihalide;

wherein the monomer M2 is an aromatic or aliphatic diol;

wherein n is the degree of polymerization;

wherein x defines the molar ratio between Ch and M1, with the loading level of Ch being tuned by the molar ratio.

4. The nonlinear optical device of claim 3 wherein the diol co-monomer M2 contains a diimide group as formed from a reaction of an aromatic dicarboxylic dianhydride and two equivalent of amino alcohol.

5. The nonlinear optical device of claim 1, 2, 3 or 4 wherein the hydroxy groups at polymer chain ends are masked by reacting the formed linear polymer with acid or acid chloride to reduce OH-induced optical loss at 1.3 $\mu$m and 1.55 $\mu$m.

6. A second-order nonlinear optical device comprising an active element including a crosslinked NLO polymer material formed from dendritic or hyperbranched macromolecule that carries one or more chromophores and thermally reactive groups at the periphery of the macromolecule for crosslinking between the macromolecules;

wherein the thermally reactive groups are trifluorovinylethers;

wherein the chromophores contain a $\pi$-conjugate polyene structure as the bridge or part of the bridge between the electron donor and electron acceptor, and the polyene structure is formed as

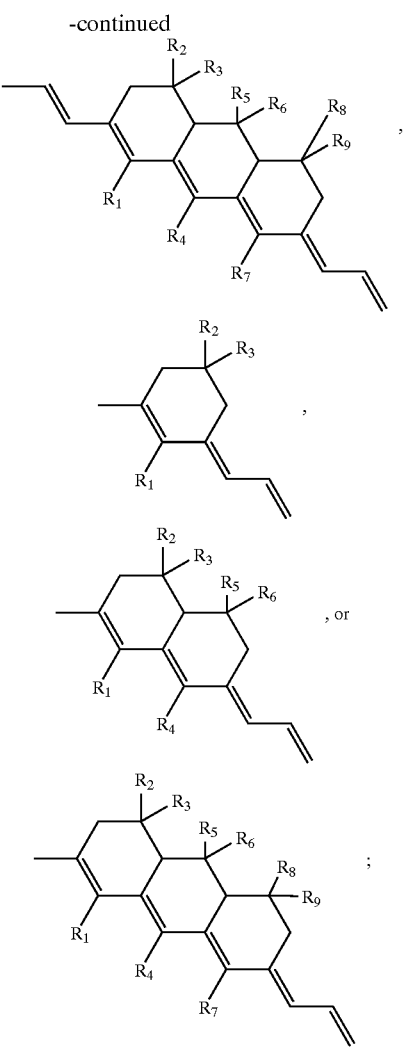

wherein $R_1$–$R_9$=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

7. A second-order nonlinear optical device comprising an active element including a crosslinked NLO polymer material formed from thermally crosslinkable macromolecule formed as:

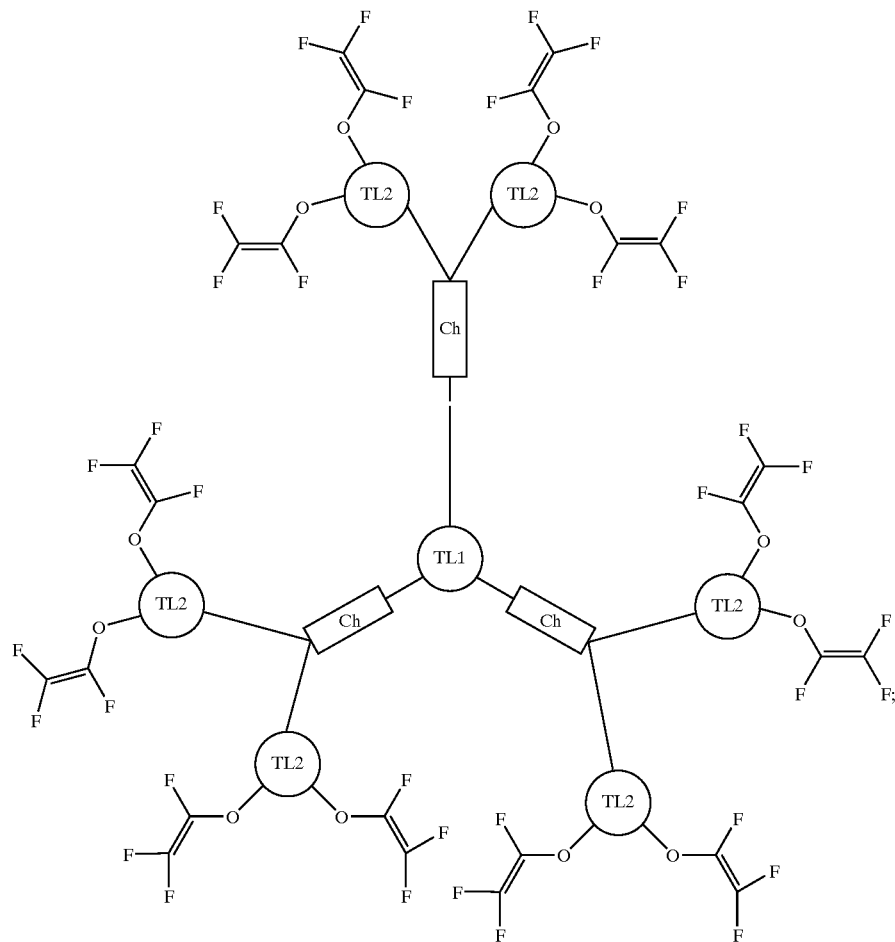
wherein Ch is a chromophore containing a π-conjugate polyene structure as the bridge or part of the bridge between the electron donor and electron acceptor, and the polyene structure is formed as
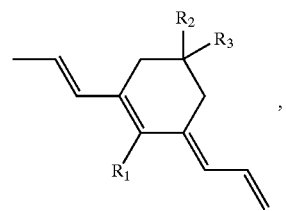
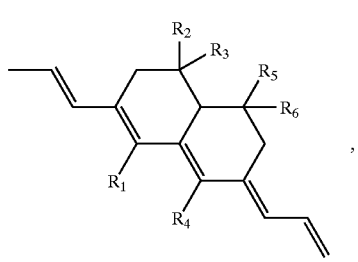
-continued
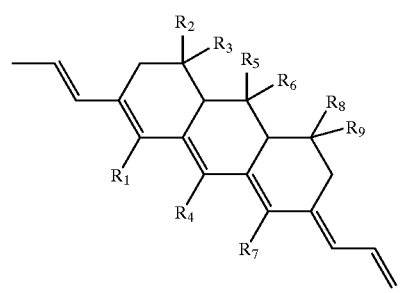
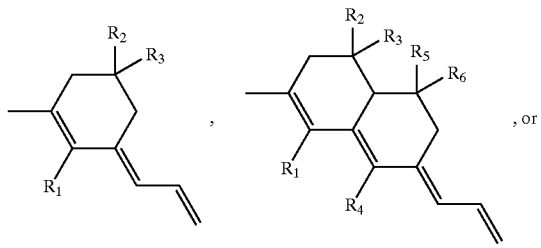

-continued

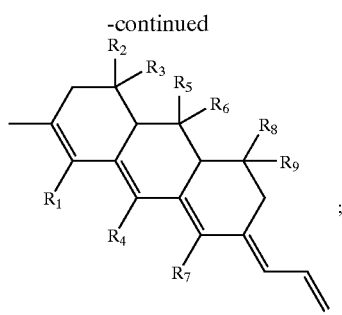

wherein $R_1$–$R_9$=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;

wherein TL1 is a tri-link core;

wherein TL2 is a tri-link unit connecting the chromophore with two crosslinking trifluorovinylethers.

8. The nonlinear optical device of claim 7 wherein the chromophores are linked to the trilinkers TL1 and TL2 by ester linkage formed from a Mitsunobu reaction between OH on the chromophores and carboxylic acids on TL1 and TL2.

9. The nonlinear optical device of claim 7 wherein the crosslinked NLO polymer material is synthesized using the scheme shown below:

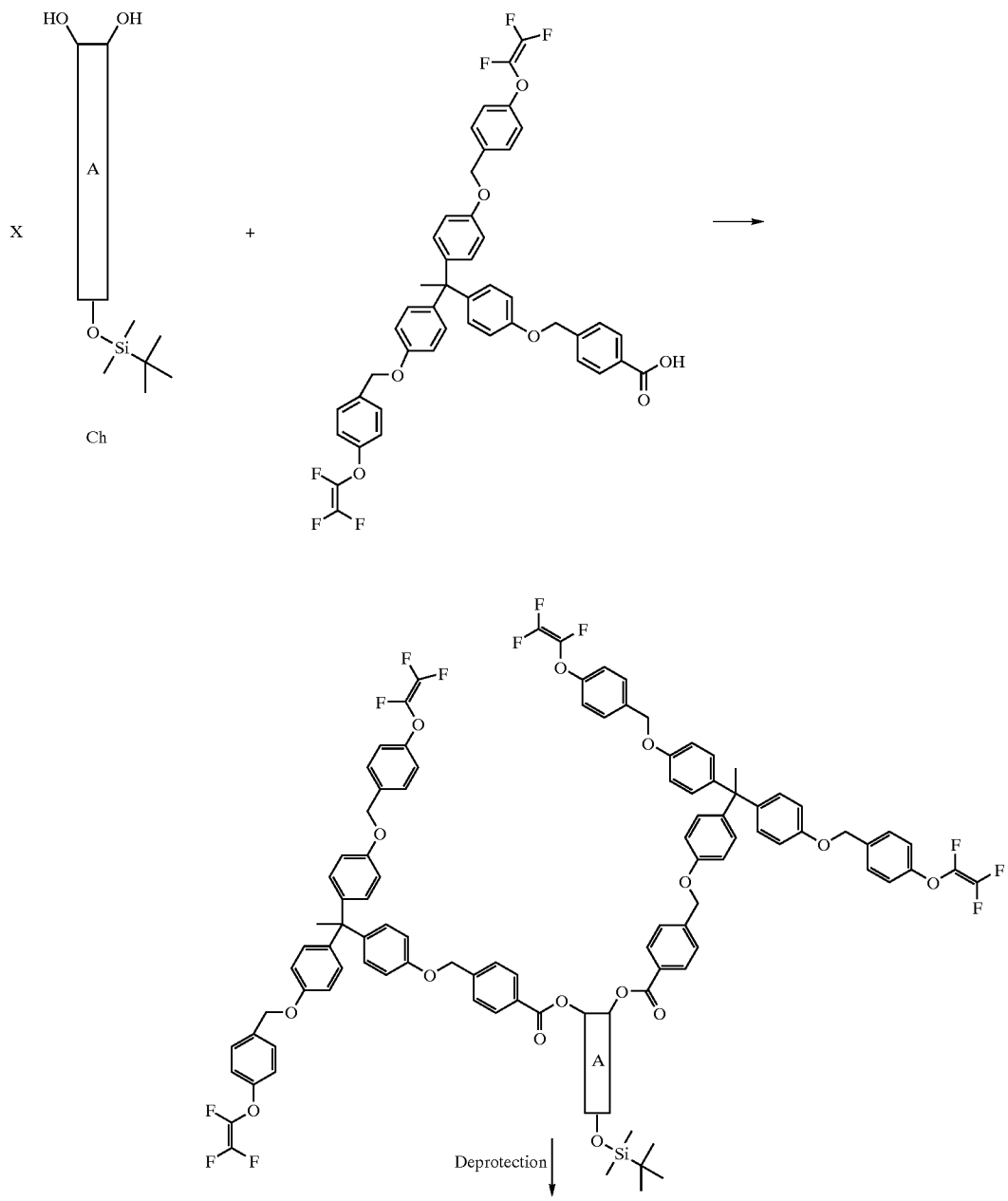

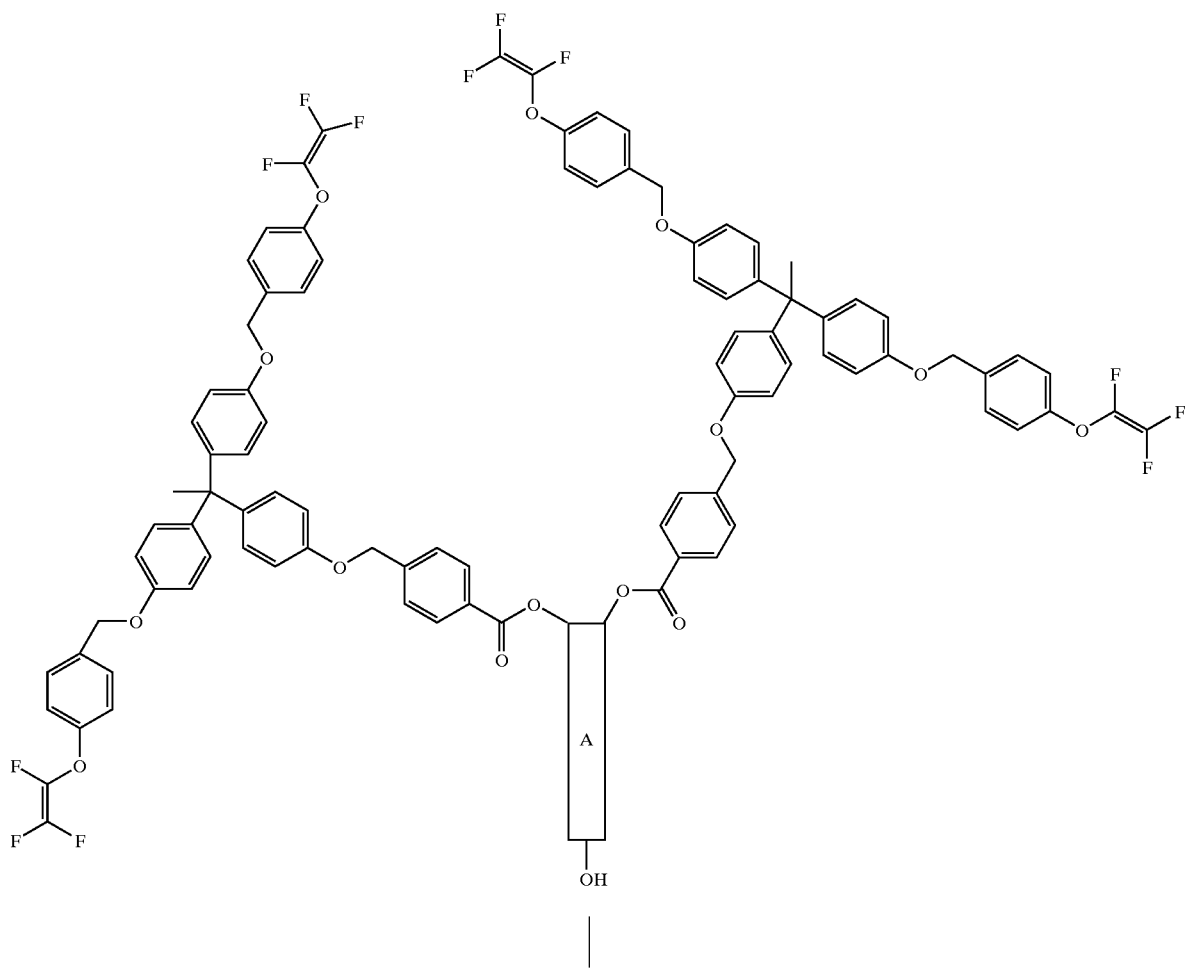
Mitsunobu condensation

-continued

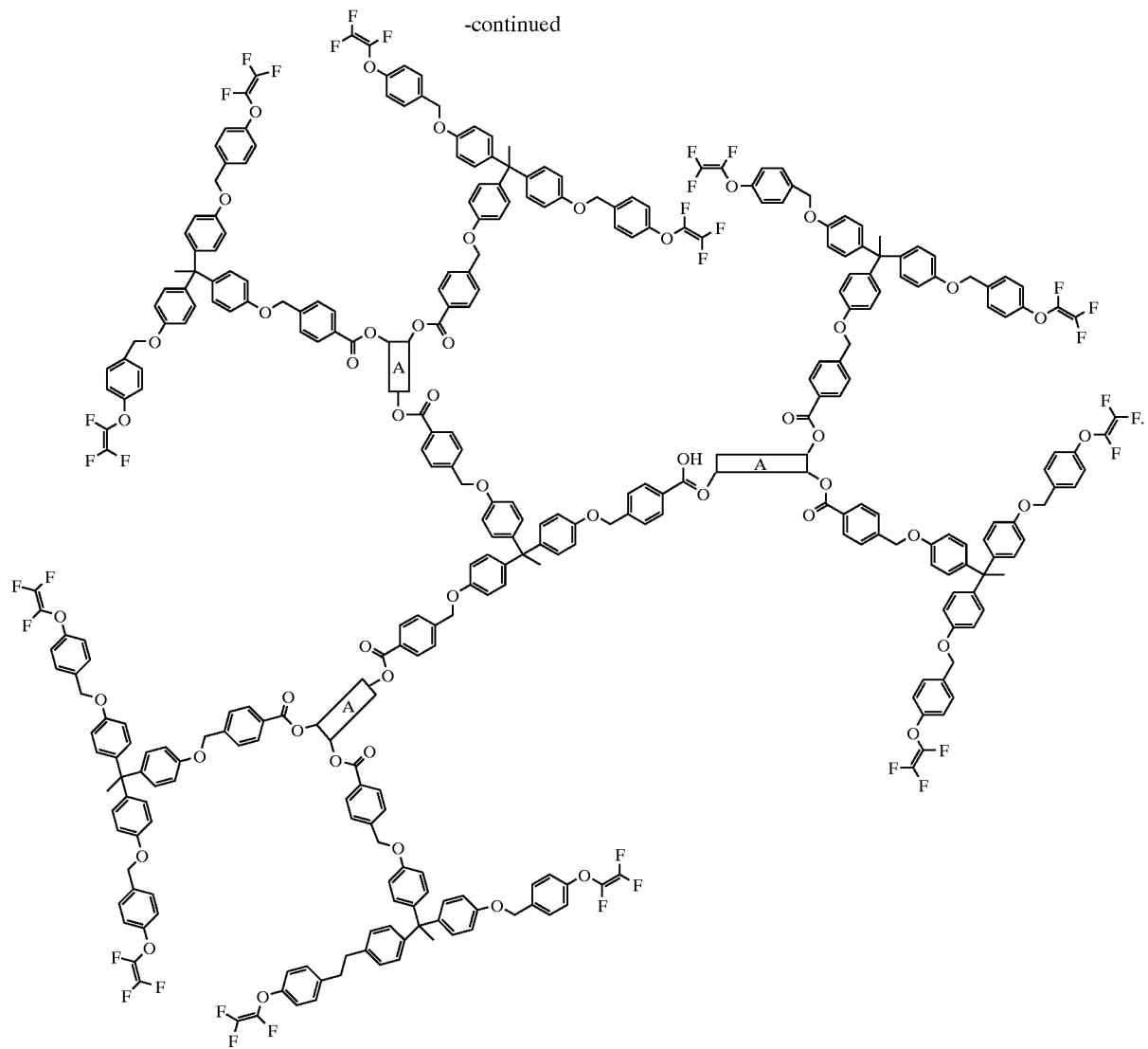

10. A second-order nonlinear optical device comprising an active element including a crosslinked NLO polymer material formed from a thermal crosslinkable macromolecule formed as:

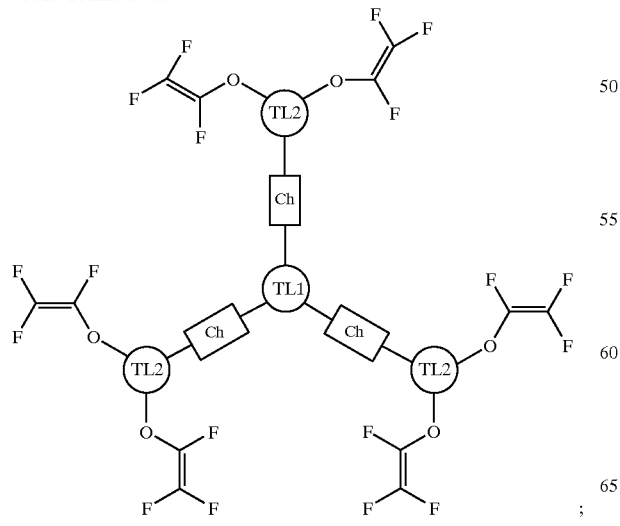

wherein Ch is a chromophore containing a π-conjugate polyene structure as the bridge or part of the bridge between the electron donor and electron acceptor, and the polyene structure is formed as

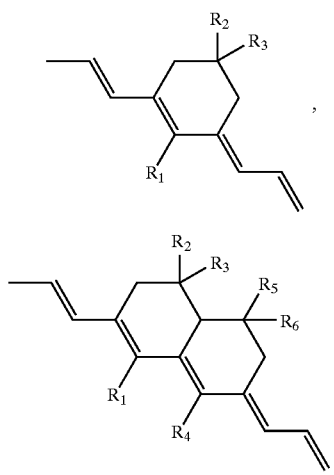

23
-continued

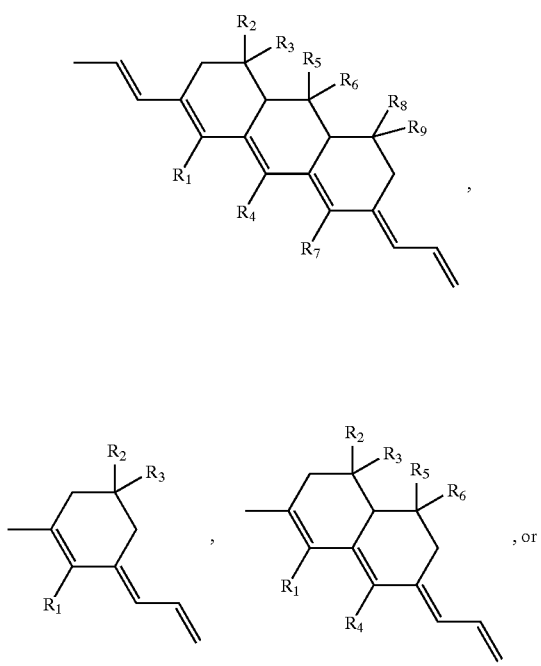

24
-continued

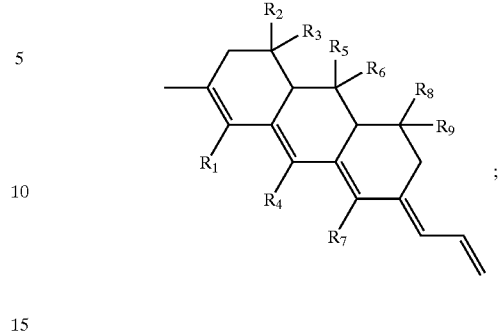

wherein $R_1$–$R_9$=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same;

wherein TL1 is a tri-link core;

wherein TL2 is a tri-link unit connecting the chromophore with two crosslinking trifluorovinylethers.

11. The nonlinear optical device of claim 10 wherein the chromophores are linked to the trilinkers TL1 and TL2 by ester linkage formed from a Mitsunobu reaction between OH on the chromophores and carboxylic acids on TL1 and TL2.

12. The nonlinear optical device of claim 10 wherein the crosslinkable macromolecule is formed using the scheme shown below:

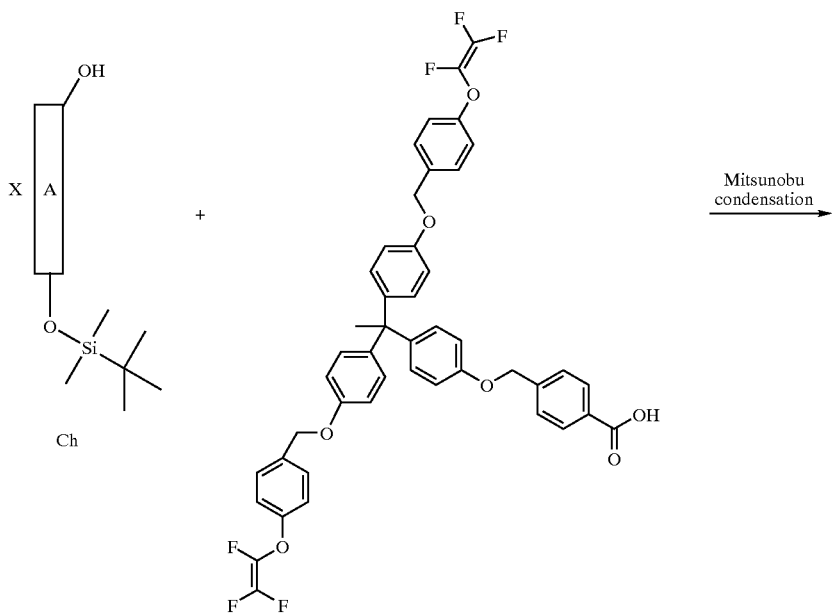

-continued
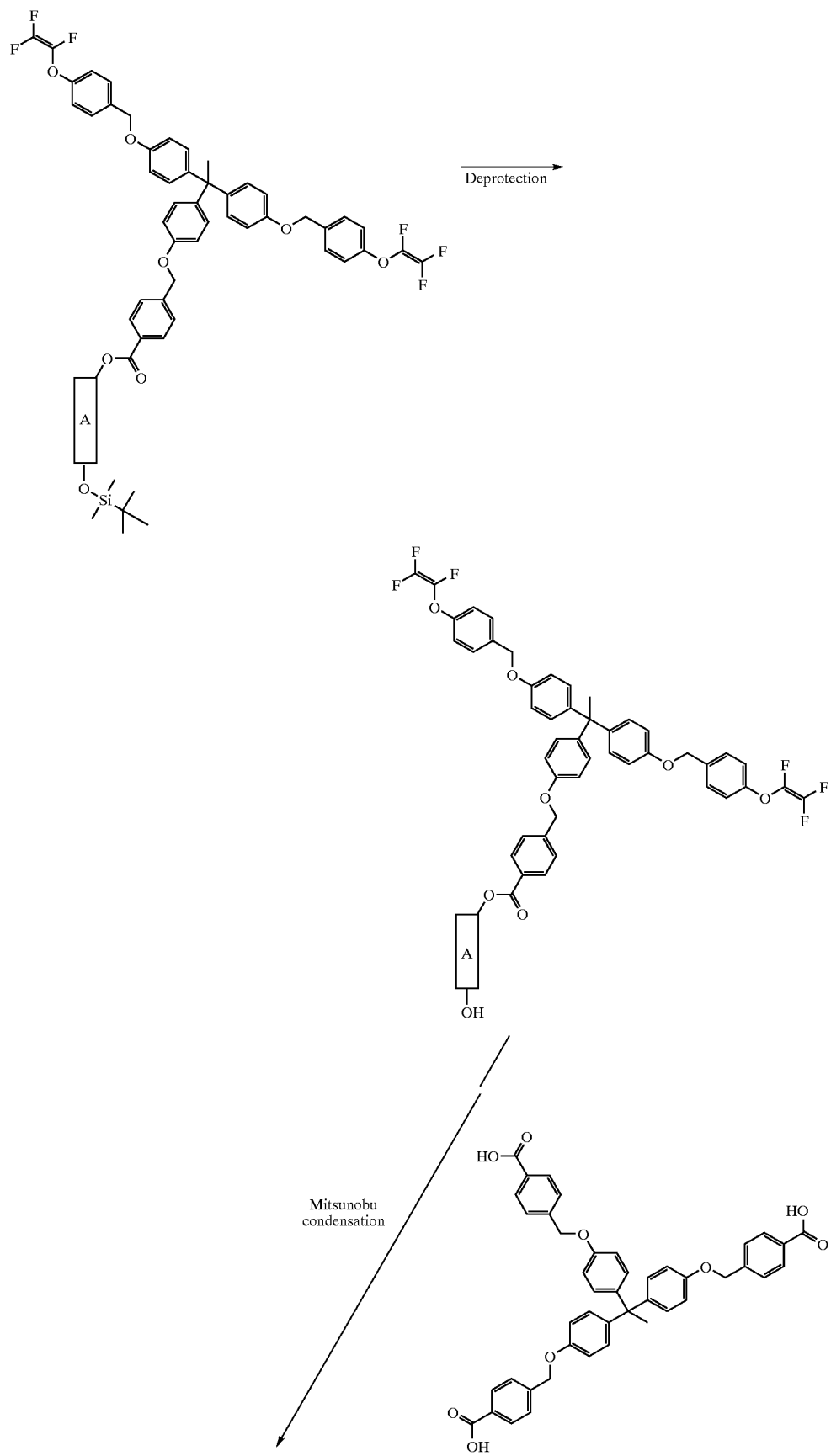

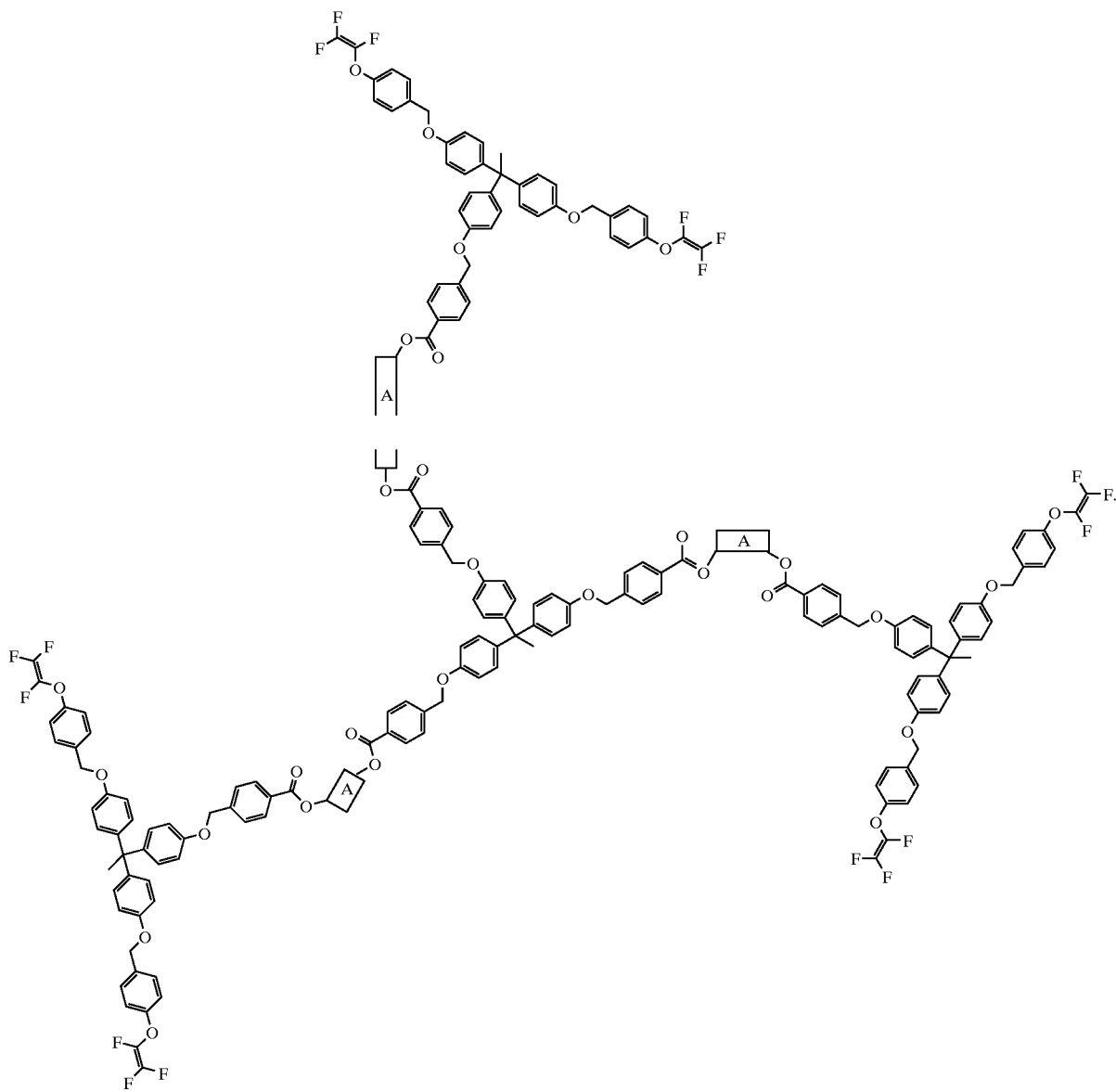

13. A second-order nonlinear optical device comprising an active element including a crosslinked NLO polymer material formed from dendrimers that each have a chromophore as the core and one or more dendrons that carry thermally reactive groups for crosslinking between the dendrimers;

wherein the thermally reactive groups are trifluorovinylethers;

wherein the chromophores contain a π-conjugate polyene structure as the bridge or part of the bridge between the electron donor and electron acceptor, and the polyene structure is formed as

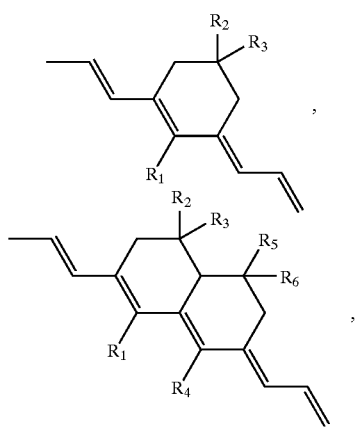

-continued

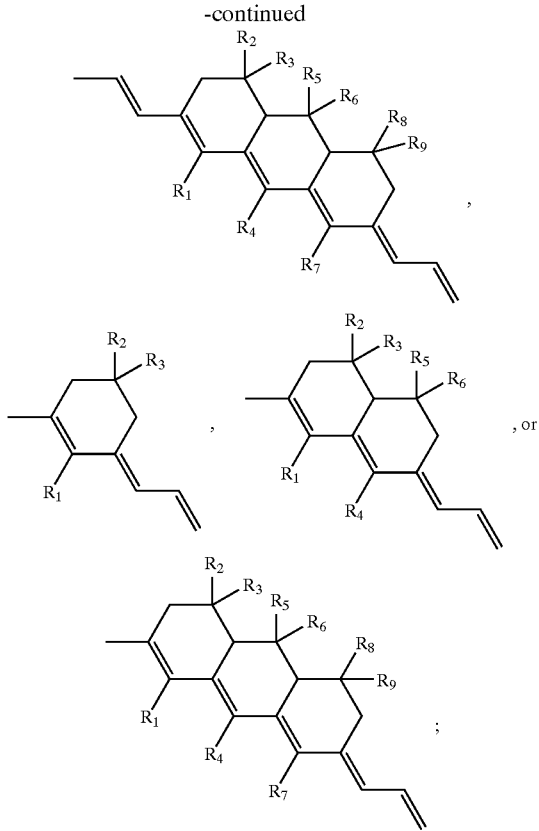

wherein R₁–R₉=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

14. A second-order nonlinear optical device comprising an active element including a crosslinked NLO polymer material formed from a crosslinkable dendrimer formed as:

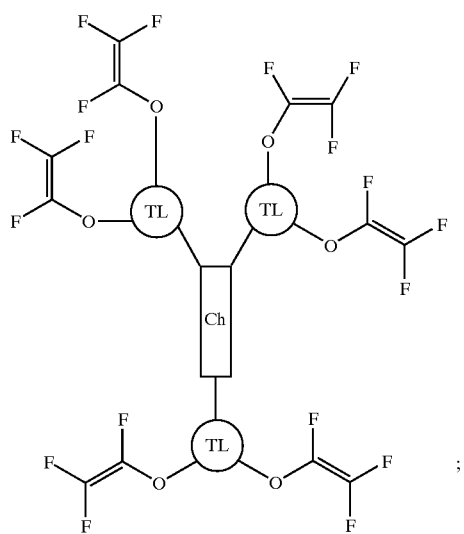

wherein Ch is a second-order NLO chromophore;
wherein TL is a tri-linking unit connecting the chromophore and two trifulorovinylethers;

wherein Ch is a hydroxy functionalized chromophore containing a π-conjugate polyene structure as the bridge or part of the bridge between the electron donor and electron acceptor, and the polyene structure is formed as

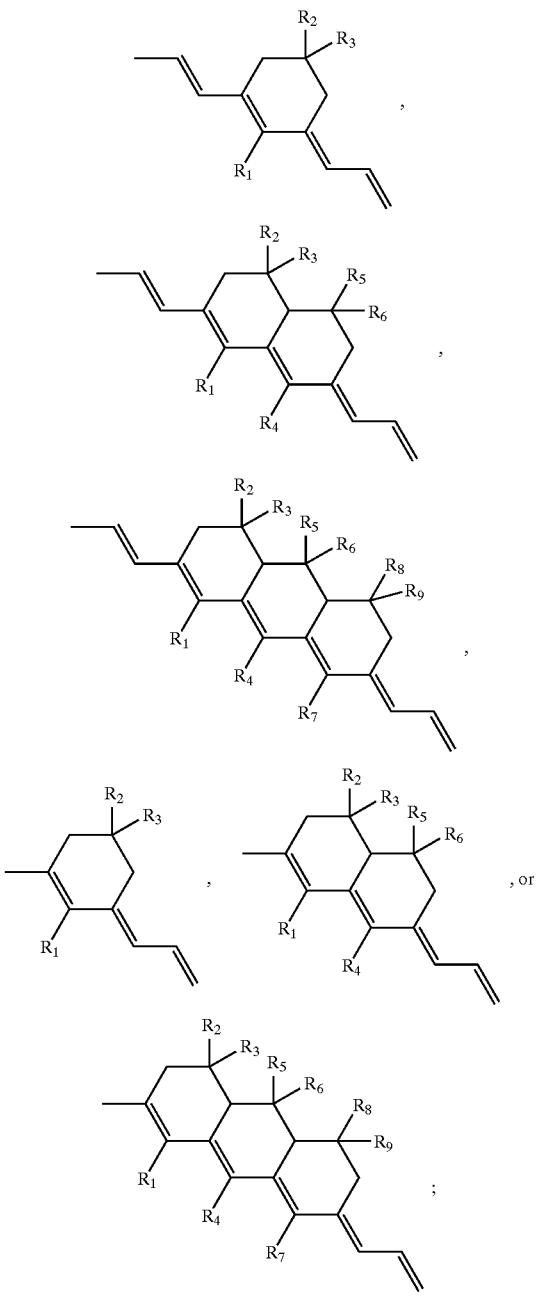

wherein R₁–R₉=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

15. A second-order nonlinear optical device comprising an active element including a crosslinked NLO polymer material formed from a crosslinkable dendrimer formed as:

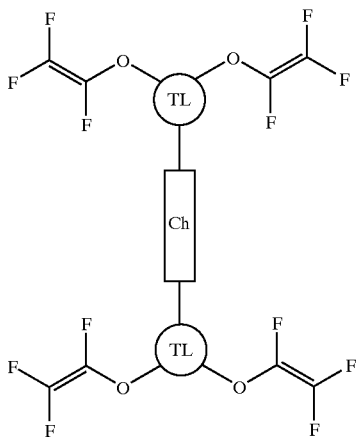

wherein Ch is a second-order NLO chromophore;

wherein TL is a tri-linking unit connecting the chromophore and two trifulorovinylethers;

wherein Ch is a hydroxy functionalized chromophore containing a π-conjugate polyene structure as the bridge or part of the bridge between the electron donor and electron acceptor, and the polyene structure is formed as

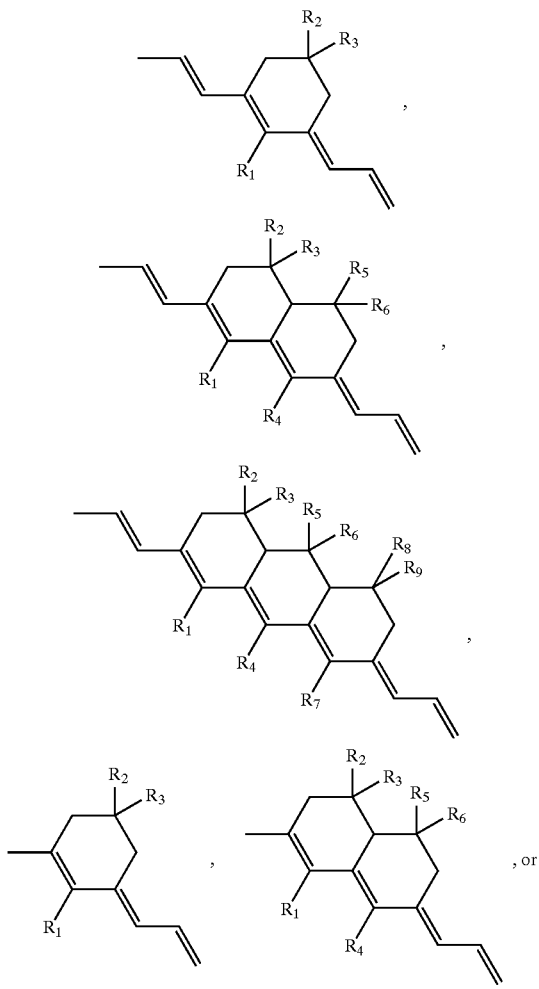

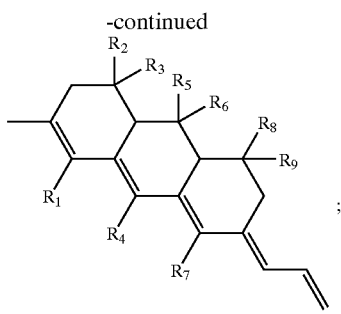

wherein $R_1-R_9$=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

16. A second-order nonlinear optical device comprising an active element including a crosslinked NLO polymer material formed from a crosslinkable dendrimer formed as:

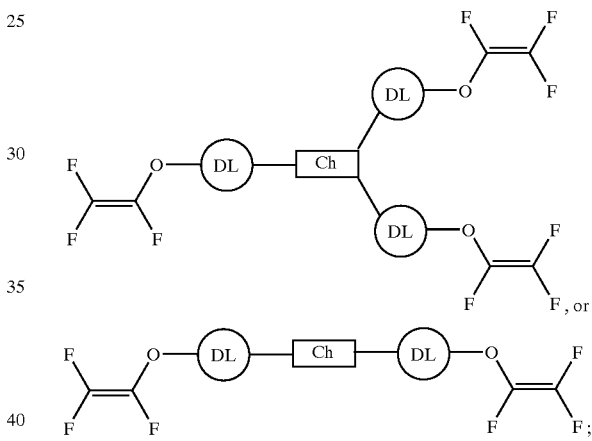

wherein Ch is a second-order NLO chromophore;

wherein DL is a di-linking unit connecting the chromophore and two trifulorovinylethers;

wherein Ch is a hydroxy functionalized chromophore containing a π-conjugate polyene structure as the bridge or part of the bridge between the electron donor and electron acceptor, and the polyene structure is formed as

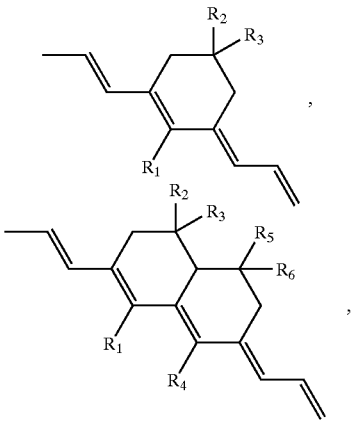

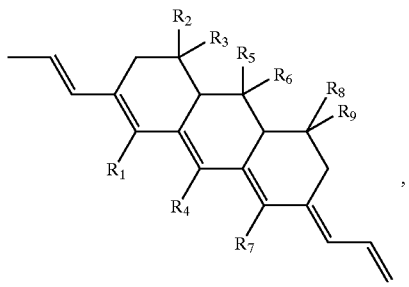

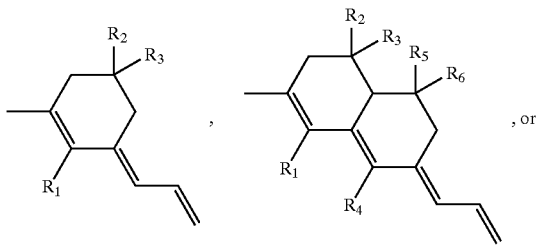
, or

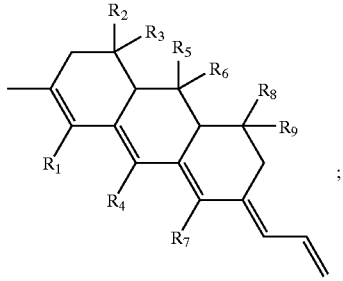
;

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

17. The nonlinear optical device of claim 16 wherein the chromophores are linked to the dilinkers DL by ester linkage formed from a Mitsunobu reaction between OH on the chromophores and carboxylic acids on TL or DL.

* * * * *